US012560209B2

(12) United States Patent
Battlogg

(10) Patent No.: US 12,560,209 B2
(45) Date of Patent: Feb. 24, 2026

(54) HAPTIC CONTROL DEVICE WITH A MAGNETORHEOLOGICAL BRAKING DEVICE

(71) Applicant: INVENTUS Engineering GmbH, St. Anton i.M. (AT)

(72) Inventor: Stefan Battlogg, St. Anton i.M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 358 days.

(21) Appl. No.: 18/248,939

(22) PCT Filed: Oct. 12, 2021

(86) PCT No.: PCT/EP2021/078167
§ 371 (c)(1),
(2) Date: Apr. 13, 2023

(87) PCT Pub. No.: WO2022/079022
PCT Pub. Date: Apr. 21, 2022

(65) Prior Publication Data
US 2023/0384815 A1 Nov. 30, 2023

(30) Foreign Application Priority Data

Oct. 13, 2020 (DE) ..................... 10 2020 126 916.1
Dec. 12, 2020 (DE) ..................... 10 2020 133 246.7

(51) Int. Cl.
*F16D 57/00* (2006.01)
*B60K 35/10* (2024.01)
(Continued)

(52) U.S. Cl.
CPC ........... *F16D 57/002* (2013.01); *B60K 35/10* (2024.01); *B62D 5/006* (2013.01); *G05G 1/08* (2013.01);
(Continued)

(58) Field of Classification Search
CPC . F16D 57/002; B60K 35/10; B60K 2360/126; B62D 5/005; B62D 5/006; G05G 1/08; G05G 5/03
(Continued)

(56) References Cited

U.S. PATENT DOCUMENTS 4,896,754 A * 1/1990 Carlson ................ H02K 49/104
464/29
5,598,908 A * 2/1997 York ..................... F16D 48/064
192/84.4
(Continued)

FOREIGN PATENT DOCUMENTS

CN 106838062 A * 6/2017 ........... F16D 57/002
CN 110454525 A * 11/2019 ........... F16D 57/002
(Continued)

OTHER PUBLICATIONS

Lord Technical Data MRF-140CG Magneto-Rheological Fluid (Year: 2008).*
(Continued)

*Primary Examiner* — Thomas J Williams
(74) *Attorney, Agent, or Firm* — Laurence A. Greenberg; Werner H. Stemer; Ralph E. Locher

(57) ABSTRACT

A haptic operating device having a magnetorheological braking device, a stationary holder, and two brake components. One of the brake components is connected to the holder for fixed rotation therewith. The brake components can be continuously rotated relative to one another about a rotation axis. A first brake component extends along the rotation axis and has a magnetically conductive core. The second brake component has a hollow casing part extending around the first brake component. Axially spaced apart peripheral braking gap portions formed between the first and second brake components are at least partially filled with a magnetorheological medium. At least one third braking gap
(Continued)

portion is located axially between a first and a second braking gap portion. A first electric coil is assigned to the first braking gap portion and a separately controllable second electric coil is assigned to the second braking gap portion.

38 Claims, 5 Drawing Sheets

(51) Int. Cl.
    *B62D 5/00* (2006.01)
    *G05G 1/08* (2006.01)
    *G05G 5/03* (2008.04)

(52) U.S. Cl.
    CPC .......... *G05G 5/03* (2013.01); *B60K 2360/126* (2024.01)

(58) Field of Classification Search
    USPC ...................................................... 188/267.2
    See application file for complete search history.

(56) References Cited

U.S. PATENT DOCUMENTS

| | | | | | |
|---|---|---|---|---|---|
| 5,944,151 | A | * | 8/1999 | Jakobs | G05G 1/08 |
| | | | | | 318/566 |
| 6,095,295 | A | * | 8/2000 | Park | F16F 9/535 |
| | | | | | 188/267.2 |
| 6,296,088 | B1 | * | 10/2001 | Carlson | F16F 9/532 |
| | | | | | 188/267.2 |
| 6,752,425 | B2 | * | 6/2004 | Loh | B62D 7/224 |
| | | | | | 280/90 |
| 10,976,827 | B2 | | 4/2021 | Battlogg | |
| 11,231,780 | B2 | | 1/2022 | Battlogg | |
| 11,295,632 | B2 | | 4/2022 | Greiner | |

| | | | | | |
|---|---|---|---|---|---|
| 2002/0057152 | A1 | * | 5/2002 | Elferich | B60K 35/10 |
| | | | | | 335/220 |
| 2002/0108804 | A1 | * | 8/2002 | Park | B62D 5/005 |
| | | | | | 180/444 |
| 2004/0163904 | A1 | * | 8/2004 | Anderfaas | F16F 9/535 |
| | | | | | 188/267.2 |
| 2006/0197741 | A1 | | 9/2006 | Biggadike | |
| 2006/0280575 | A1 | | 12/2006 | Ruettiger | |
| 2018/0298959 | A1 | * | 10/2018 | Battlogg | F16D 57/002 |
| 2020/0174512 | A1 | | 6/2020 | Battlogg | |
| 2020/0257369 | A1 | | 8/2020 | Battlogg | |
| 2020/0332846 | A1 | * | 10/2020 | Koike | G05G 1/10 |
| 2020/0355229 | A1 | | 11/2020 | Battlogg | |
| 2023/0384815 | A1 | * | 11/2023 | Battlogg | B60K 35/10 |

FOREIGN PATENT DOCUMENTS

| | | | | | |
|---|---|---|---|---|---|
| CN | 110869885 | A | | 3/2020 | |
| DE | 10029191 | A1 | | 12/2001 | |
| DE | 10221241 | A1 | | 11/2003 | |
| DE | 102004041690 | A1 | | 3/2005 | |
| DE | 102004009906 | B3 | | 7/2005 | |
| DE | 102010055831 | A1 | | 6/2012 | |
| DE | 102017111031 | A1 | | 11/2018 | |
| DE | 102018100390 | A1 | | 7/2019 | |
| DE | 102018222844 | B3 | | 4/2020 | |
| EP | 2603774 | B1 | | 3/2015 | |
| EP | 3118075 | A1 | | 1/2017 | |
| EP | 3299658 | B1 | | 8/2019 | |
| EP | 3317750 | B1 | | 10/2019 | |
| KR | 2015011678 | A | * | 2/2015 | ........... F16D 57/002 |
| WO | 2012034697 | A1 | | 3/2012 | |
| WO | 2018215350 | A1 | | 11/2018 | |

OTHER PUBLICATIONS

CN-106838062-A. (Year: 2017).*
CN-110454525-A (Year: 2019).*

* cited by examiner

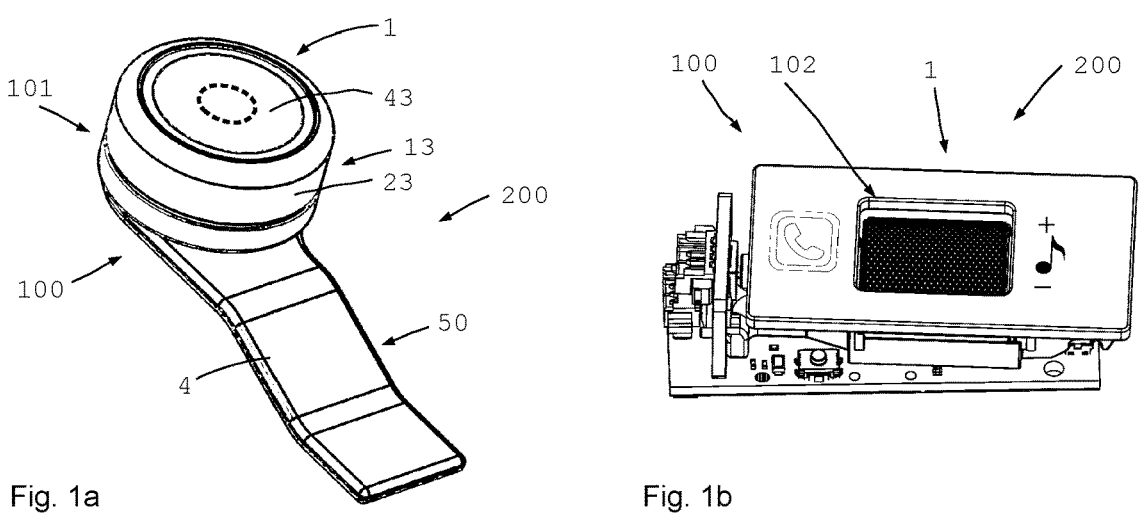
Fig. 1a                    Fig. 1b
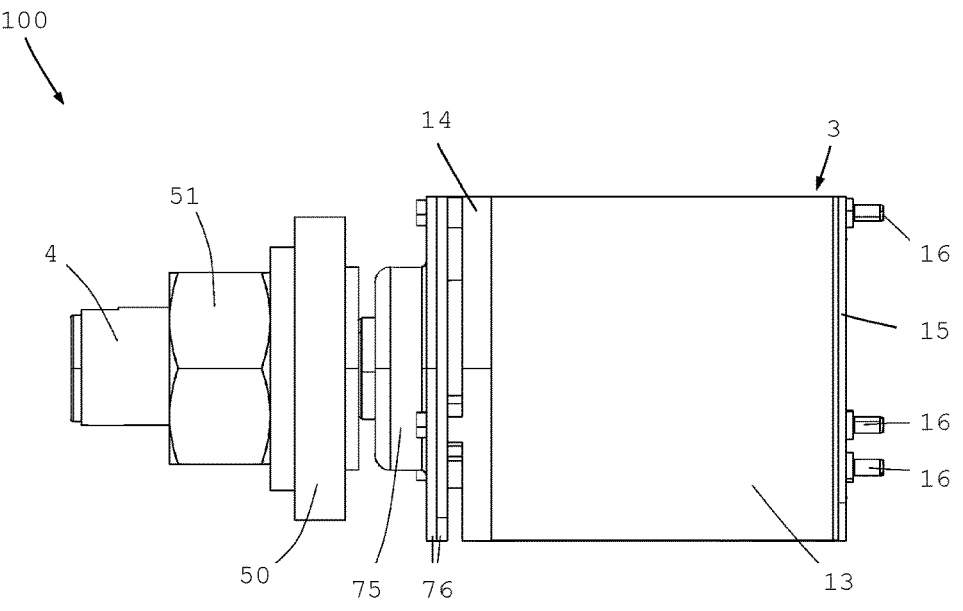
Fig. 2

HAPTIC CONTROL DEVICE WITH A MAGNETORHEOLOGICAL BRAKING DEVICE

FIELD AND BACKGROUND OF THE INVENTION

The invention relates to a haptic operating device and in particular a haptic operating control button with a magnetorheological braking device with a fixed holder and with at least two braking components which can be rotated continuously relative to one another about an axis of rotation, and a method and the use of the device.

The haptic operating device or actuating device can be used in particular when operating technical equipment in motor vehicles and other vehicles, for example as a rotating knob, rotating knob/push button, for infotainment, air conditioning (temperature, ventilation level, distribution), as a gear selector switch, for navigation, with cruise control, with distance control, as seat adjustment, in the steering (steer by wire or steering in general) or in the steering wheel, in the handlebar or steering column of a two-wheeler, three-wheeler or four-wheeler (e.g., OFF-Highway vehicle such as vehicles from Polaris), jet skis, snowmobiles, ALL Terrain Vehicles, for the pedals, for adjusting the chassis, for changing the driving mode, for adjusting the windscreen wipers, for adjusting windows or for adjusting the sunroof, for parking assistants or for setting (partly) autonomous driving or even as a replacement steering wheel.

It can be used in motor vehicles, aircraft, airplanes, ships, boats, in agricultural engineering, for example in tractors or combine harvesters, harvesters and other field machines for agriculture. It can also be used in construction machinery and, for example, forklifts or similar machines or in medical or industrial systems.

The invention can also be used when operating or as an input device for washing machines, kitchen appliances and household appliances, radios, cameras and film cameras, hi-fi and television systems, smart devices, smart home devices, laptops, PCs, smartwatches, in a crown wheel of wristwatches or as a computer mouse or as a rotary wheel in a computer mouse, on game consoles, in gaming equipment, as rotary knob used in a keyboard or other devices.

Magnetorheological fluids have, for example, very fine ferromagnetic particles, such as carbonyl iron powder, distributed in an oil. In magnetorheological fluids, approximately round or spherical particles with a production-related diameter of 1 μm to 10 μm are used, with the particle size and particle shape not being uniform. If such a magnetorheological fluid is subjected to a magnetic field, the carbonyl iron particles of the magnetorheological fluid or the magnetorheological medium or the magnetorheological fluid link up along the magnetic field lines, so that the rheological properties of the magnetorheological medium are significantly influenced depending on the shape and strength of the magnetic field (transmissible shear stresses).

Brake units with magnetorheological fluids are known from the prior art, for example the MRF brake from Lord Corporation in various sizes (5 Nm, 12 Nm, 20 Nm): https://www.lord.com/products-and-solutions/steer-by-wire-tactile-feed back-device. These are also used, among other things, as "steer-by-wire tactile feedback". These brakes function per se. However, a disadvantage of these MRF brakes is their relatively high basic friction (basic torque) in relation to the maximum torque (working range). The working range of the 5 Nm brake according to Lord's website/specification, it is 0.5 to 5 Nm (factor 10), with the 12 Nm brake the working range is between 1 Nm and 12 Nm (factor 12) and with the 20 Nm brake the working range is between 1 Nm and 20 Nm (factor 20). This relatively small working range is not sufficient for many applications, which is why these series products are primarily used for coarse motor applications (among other things, operation mostly with gloves, as in industry, on agricultural machines, on forklifts . . . ).

Fine motor applications such as operating infotainment systems with rotary/push controls using three fingers in the car, operating game consoles when gaming, but also steering a car require a significantly lower basic torque with a higher maximum torque at the same time, i.e., a significantly larger working range. The high basic torque, in particular, quickly leads to fatigue and makes very fine adjustments difficult to feel. However, the well-known MRF brakes do not allow a large working range because the friction surfaces are too large. Although smaller friction surfaces would reduce the basic torque, the maximum torque would also be smaller.

According to WO 2012/034697 A1 a magnetorheological transmission device has become known which has two components which can be coupled and whose coupling intensity can be influenced. A channel with a magnetorheological medium is provided to influence the coupling intensity. The magnetorheological medium in the channel is influenced by a magnetic field. Rotating bodies are provided in the channel, on which acute-angled areas containing the magnetorheological medium are provided. The channel, or at least part of it, can be subjected to the magnetic field of a magnetic field generating device in order to selectively (magnetically) concatenate the particles and to wedge them with the rotating bodies or to release them. This magnetorheological transmission device can also be used on a rotary knob to operate technical devices. Such a magnetorheological transmission device works and allows the transmission of very high forces or torques with a relatively small design or volume at the same time.

WO 2012/034697 A1 also discloses a rotary knob or operating knob in which the actual knob can be rotated about an attached shaft. The braking torque can be controlled via the magnetic field generated by an electric coil. If an even higher braking torque that can be generated is desired, cylindrical rollers can also be used instead of spherical rotating bodies, so that the magnetic field acts over a longer distance or larger area (there is a magnetic field concentration and wedge formation over a larger area). A haptic control device with such rotary bodies or rolling elements allows a satisfactory function and a very high torque for a haptic control knob, while at the same time there is a low braking/basic torque when the magnetic field is switched off (e.g., less than 0.5 Nm at a maximum torque of 50 Nm. The ratio of maximum generated torque to minimum torque (basic torque) is high (>100).

The disadvantage, however, is that the high maximum torque can only be achieved at low speeds of the haptic operating device. If the speed exceeds a value that depends on the respective design, the maximum torque drops considerably and does not always meet the requirements.

SUMMARY OF THE INVENTION

It is therefore the object of the present invention to provide a haptic operating device and in particular a haptic operating button with a magnetorheological braking or damping device, with which a low basic torque and a relatively high maximum torque can be generated at different speeds.

This object is achieved by a haptic operating device with the features of the claims. The method according to the invention is the subject of the dependent claims and the use according to the invention is the subject of the further claims. Preferred developments of the invention are the subject matter of the dependent claims. Further advantages and features of the present invention result from the general description and from the description of the exemplary embodiments.

A haptic control device according to the invention can be used, in particular, as a haptic control knob or rotary knob or can be formed as a rotating element. The haptic operating device has at least one magnetorheological braking device with a stationary holder and with at least two braking components. One of the two brake components is non-rotatably connected to the holder. The two brake components are continuously rotatable relative to one another about a (common) axis of rotation. A first braking component extends along the axis of rotation (in the axial direction) and comprises a core made of a magnetically conductive material. This means that the first braking component extends at least in sections along the axis of rotation. Or that at least a portion of the first braking component, or preferably a substantial part of the first braking component, extends along the axis of rotation. The second brake component comprises a hollow casing part (made of a magnetically conductive material) extending around the first brake component. Between the first and the second brake component are circumferential, and in particular axially spaced apart, brake gap sections that are at least partially filled with a magnetorheological medium. At least one third or middle brake gap section is arranged (in the axial direction) between a first brake gap section and a second brake gap section. A first electric coil is assigned to the first brake gap section and a separately controllable second electric coil is assigned to the second brake gap section.

The haptic operating device according to the invention has many advantages. A significant advantage of the haptic operating device according to the invention is that two separate electrical coils (with braking gap sections that interact with them) are provided and can be controlled differently. As a result, the haptic effect can be adjusted even better and more sensitively. The braking effect can thus be set, for example, at low speeds or at a standstill with one or the first electrical coil (and the associated braking gap), while the braking torque can be optimally set, for example at higher speeds, with the second electrical coil (plus braking gap). The respective current intensities and current curves can be set independently of one another.

Especially when the available electronics do not have a large control range, it is advantageous if two (same or sometimes different) coils for different torques and speeds can be controlled independently of each other. This is the case, for example, in passenger cars, where the on-board electronics only provide limited power or voltage. The haptic operating device can be used as a rotary/push button to control the on-board computer or the various functions of the vehicle's components, or in the steering wheel as an operating roller or for steer-by-wire applications. A first electrical coil (e.g., with a star contour in the braking gap section) can be used there for the low braking torques, in which small torques (e.g., 0.1 Nm) are to be generated with high resolution. In this case, the controllable torque is also not (or only minimally) dependent on the speed. The second electrical coil can, for example, the magnetic field in another and e.g., the second or third brake gap section (e.g., wedge bearing with rolling elements) for high locking torques or the maximum torque or regulate, as is necessary with an end stop. Such high torques do not require a high resolution and the speed dependency is not decisive in this case.

The invention makes it possible for braking at a standstill (blocking), for example, to use an electric coil or a magnetic circuit (designed especially for this purpose), generating a special high braking torque. The reproducibility often does not have to be particularly precise (at a standstill with high torques), which reduces the design effort and costs. A stationary brake component does not rotate as long as the braking torque is high enough and not exceeded. The other electrical coil or the other magnetic circuit can then be designed, for example, to brake the corresponding braking component in a targeted manner during operation when rotating. This regularly requires a higher level of reproducibility, so that no difference or only a small difference can be felt haptically. This usually requires higher demands on the structural conditions and can require greater technical effort and higher costs. The invention makes both properties possible in a simple manner and, overall, a cost-effective design.

At least one braking gap portion is formed at a braking gap. It is possible and preferred that two or more braking gap sections are provided or formed on a common braking gap or on different (and optionally spatially or structurally separate) braking gaps. Thus, all braking gap sections can be formed at a single braking gap. It is also possible for each individual braking gap section to be formed on a separate braking gap.

At least two differently designed brake gap sections are particularly preferably included. In particular, the first and the second brake gap sections are designed differently from one another. The first and the second brake gap sections are preferably designed differently in the radial and/or axial (and/or oblique) direction and/or are designed differently in terms of function.

As a result, the haptic operating device can be braked in different ways at different speeds. While, for example, the first brake gap section (functional) a higher torque at lower speeds can generate, e.g., the second brake gap portion due to the other structure produce a relatively high torque even at higher speeds. Such effects can also be generated by the two electrical coils and, in particular, can be significantly intensified. A particularly high torque can be generated at standstill and at high speeds a finely controllable low torque or, if necessary, a high torque, depending on the activation of the two electric coils.

As a result, a constant maximum torque can also be achieved over the entire speed range, which is also very advantageous in many applications.

The redundancy provided by such a system with two electrical coils is also advantageous. If one coil should fail, the second coil can still generate a magnetic field and thus provide a controllable torque (although not always with the same quality) via the associated braking gap section. Redundancy is very beneficial for applications that require a high level of reliability.

In particular, the first brake gap section and the second brake gap section are designed differently. At least two (functionally) different and radially designed brake gap sections are preferably included. The braking gap sections are preferably formed separately from one another and, in advantageous configurations, are separated from one another in the axial direction.

Preferably, the first braking gap section and the second braking gap section have different widths (gap height) and/or have different cross-sectional profiles.

It is also particularly preferred that at least partially different materials are used on the first braking gap section and the second braking gap section. In particular, in the areas of the first brake gap section and the second brake gap section materials used on the core and/or the shell part differ at least in sections. The same or different materials and constructions can be used for the electrical coils.

The two brake gap sections can have different running clearances and gap dimensions and/or gap contours and gap profiles (of the parts moving towards one another). A small gap height can result in higher moments, but is often more difficult to control in terms of control technology. A large gap height usually behaves in the opposite way (lower moment, but better controllable). Depending on the requirements, one (first) or the other (second) electric coil (electrical coil) can be energized. For example, an end stop (stop, barrier) usually requires very high torques and little control technology, since the actuator is virtually stationary (standstill). Here a small gap (gap height) or possible rotating bodies/rollers in the braking gap section are efficient. Braking that is as constant as possible at higher speeds, on the other hand, regularly requires high control quality; a larger gap height and/or a disc/star contour on a braking gap section is advantageous here.

A significant advantage of such a haptic operating device is that it includes two functionally different brake gap sections that are each formed in the radial direction. As a result, the haptic operating device can be braked in different ways at different speeds. While one of the brake gap sections (functionally related) generates a higher torque at lower speeds, the other brake gap section generates a relatively high torque even at higher speeds due to the different structure. As a result, a constant maximum torque is achieved over the entire speed range, which is very advantageous in many applications.

The haptic operating device has a simple structure, uses only a few parts and allows easy and inexpensive manufacture. The basic friction is low and a high maximum torque can be provided for different speeds and also at standstill. Production is simple and inexpensive.

The first braking component defines an axial direction. In particular, an axis of symmetry of the first braking component is the axis of rotation. The core of the first brake component preferably extends in the axial direction, but can also have a slight angle to the axial direction.

The invention makes it possible to generate a high braking torque at different speeds in a small installation space. The magnetic field passes through the two different braking gap sections between the core and the casing part, in each case essentially radially or in any case transversely to the axis of rotation.

A disk contour is particularly preferably arranged or formed between the casing part and the core on at least one and in particular the first braking gap section. The first brake gap section is in particular an axially outer brake gap section, in particular if a total of three (or four) brake gap sections are included.

In all configurations it is preferred that all braking gap sections are at least partially filled with a magnetorheological medium.

In all configurations, it is preferred that the braking gap sections are formed in a common gap that extends circumferentially between the two braking components.

A disk contour is preferably arranged, fastened or formed on the first brake gap section or on at least one brake gap section on the casing part and/or the core. becomes practical the (first) brake gap section is preferably defined by the disk contour. A disk contour is also understood to mean a shape similar to a disk contour.

The disk contour can be formed integrally with the core as an annular flange, but can also be a separate part which is arranged or attached to the core. The disk contour can also be in several parts. It is also conceivable that the disk contour is formed integrally on the casing part or is attached to it. In the first case the disk contour projects radially outwards from the core and in the second case radially inwards from the shell part.

Two disk contours are also possible, one of which protrudes radially outwards from the core and the other protrudes radially inwards from the casing part. The associated brake gap section is then formed (in particular radially) between the disk contours. It is also conceivable that a defined axial gap, which belongs to the braking gap section, is formed between a disk contour protruding radially outwards from the core and a disk contour protruding radially inwards from the casing part. However, radial gaps have the advantage that axial play does not affect the gap height or gap width.

A plurality of rolling elements are preferably arranged on the circumference of the core at the second (or at least one) braking gap section. In this case, the rolling elements are preferably accommodated on a holder (rolling element holder). The holder or rolling body holder particularly preferably consists of a non-magnetically conductive material.

The second braking gap section is preferably also an axially outer braking gap section.

In particular, at least one star contour is arranged on the second (or at least on one) braking gap section between the casing part and the core. This results in a variable gap height over the circumference of the braking gap section in the area of the star contour. In this configuration, too, the second brake gap section is preferably also an axially outer brake gap section.

Magnetic field concentrators are preferably formed or arranged on a star contour, which protrude (radially) into the gap, so that in the region of the star contour the circumferential second brake gap section with a variable gap height results The elements serving as magnetic field concentrators can protrude radially inwards or radially outwards or axially from a star contour. The magnetic field concentrators can, for. B. tooth-shaped, arc-shaped, sinusoidal, trapezoidal and can be arranged regularly or irregularly distributed and be of different heights.

A (single) magnetic field concentrator can also be designed as an arm. A magnetic field concentrator may be attached individually or integrally formed.

Preferably, the first electrical coil and the second electrical coil are each accommodated (radially) between the casing part and the core and are each wound around the axis of rotation.

The third brake gap section is formed in particular by at least one ring contour, which is arranged or formed between the casing part and the core. Analogous to a previously described disk contour, the ring contour can be designed integrally or as a separate part, also in several parts. In particular, the ring contour is longer in the axial direction than the disk contour.

The ring contour preferably forms a peripheral thin gap section between the casing part and the core, namely the third braking gap section.

The first electrical coil is preferably arranged axially between the first braking gap section and the annular contour. The second electric coil is preferably arranged axially between the ring contour and the second brake gap section.

The ring contour can be designed as a separate part.

In all configurations, it is particularly preferred that the magnetic fields of the first electric coil and the second electric coil each run through the ring contour to a significant extent.

In all configurations, it is preferred that the first electrical coil and the second electrical coil are designed differently. As a result, different properties can be assigned to the braking gap sections.

It is preferred that at least two electrical coils and in particular the first electrical coil and the second electrical coil differ in at least one parameter from a group of parameters and in particular coil parameters. The group of parameters includes in particular the wire diameter and wire cross-section (round, square . . . ), the number of windings, the winding window, the type of winding, the coil width, the coil geometry, the coil cross-section, the coil diameter and the material of the coil and/or the adjacent material.

It is preferred that at least two electrical coils and in particular the first electrical coil and the second electrical coil differ in at least one parameter from a group of parameters and in particular coil parameters. The group of parameters includes in particular the wire diameter and wire cross-section (round, square . . . ), the number of windings, the winding window, the type of winding, the coil width, the coil geometry, the coil cross-section, the coil diameter and the material of the coil and/or the adjacent material.

By varying the parameters or properties of the electrical coils and/or the associated magnetic circuits an electrical coil can be trimmed in the "fast" or energy-efficient direction. An electrical coil and the braking device as a whole can thus generate high and rapid braking torques, while the other electrical coil generates energy-efficient braking torques, for example. The latter is particularly advantageous in battery-powered vehicles.

However, three or more electrical coils and braking gap sections can also be included or provided.

In particularly preferred configurations and developments, a disk contour is formed between the casing part and the core on the first brake gap section, and a plurality of rolling elements are arranged on the circumference of the core in the second brake gap section, and the ring contour is arranged in the third brake gap section. The ring contour is in particular wider than the disk contour on the first brake gap section.

The holder preferably comprises an axle or shaft, on which a cable bushing is formed, through which electrical cables are routed via an inner part connected to the axle to the first and the second electrical coil.

The two electric coils can be taken to a (common or separate) holder (coil holder).

In particular, a first and a second cover are connected to the casing part at the axial ends, with the axis only being passed through a cover and being sealed off from the axis.

It is also possible and preferred that at least a fourth braking gap section is included. Then it is possible that the first electric coil e.g., the first and the third brake gap section are assigned and that the second electric coil e.g., the second and the fourth brake gap section are assigned. Another is also possible assignment. It is also possible that the magnetic field of at least one electrical coil passes through at least three brake gap sections.

If rolling bodies are used in the second brake gap section, then these serve in practice, in particular, as magnetic field concentrators. Due to the rolling elements (serving as magnetic field concentrators) there can be acute angles between the individual magnetic field lines and the radial orientation, but generally or on average the magnetic field runs essentially radially. The same applies to the other brake gap section with the disk contour, in which a three-dimensional alignment of the magnetic field lines can also result at the radial end of the disk contour, but on average or overall are again aligned essentially radially.

In particular, in an axial area (directly) adjacent to the first electrical coil, a disk contour or disk body is formed between the casing part and the core, and in a (different) axial section (directly) adjacent to a second electrical coil, there is a plurality of rolling bodies (as magnetic field concentrators) arranged on the circumference of the core. In particular, the rolling elements are arranged in a common plane transversely or perpendicularly to the axis of rotation. Preferably, the rolling elements can move completely around the core. An outer surface of the core is preferably cylindrical in the second braking gap portion. The ring contour is preferably arranged (directly) between the first electrical coil and the second electrical coil.

A radius or (typical or maximum) diameter of the first brake gap section is preferably approximately and in particular exactly the same size as a radius or (typical or maximum) diameter of the second brake gap section and/or the third brake gap section. This results in high torques even at higher speeds and when starting from a standstill producible.

The magnetorheological medium particularly wets the first and the second brake component at least in sections.

The first electrical coil and the second electrical coil are preferably wound around the axis of rotation and substantially generate a magnetic field in the axial direction within the core. The two electric coils are taken up radially between the core and the casing part. The electrical coils can be wound around the core or attached to the inside of the casing part.

The core consists of a magnetically (highly) conductive material. The first braking component comprises the core and in particular an axle or a shaft which, in particular, consists at least partially or completely of a magnetically non-conductive material. Preferably, the axle (the shaft) and the core are detachably connected to each other.

The disk contour consists at least partially or completely of a magnetically (highly) conductive material.

In a preferred development, the disk contour is designed as a separate disk body. It is also possible that the disk contour is formed in one piece with the core and, e.g., T-shaped, with the long leg of the "T" running along the axis of rotation. It is also possible that part of the disk contour is designed in one piece with the core and is supplemented by a separate disk body. In simple and particularly preferred embodiments, the disk contour is formed by a separate disk body that is attached to or on the core.

The disk body is preferably applied to the core. For this purpose, the core has, in particular, an adapted receptacle. It is possible and preferred, for example, for the disk body to be connected or pressed onto the core. However, it is also possible for the disk contour or the disk body to be connected to the casing part and, for example, to be pressed into it. It is also conceivable that two disk bodies adapted to one another are used, between which a radial braking gap section is formed. A first hollow-cylindrical disk contour can be applied to the core and a second hollow-cylindrical disk contour with a correspondingly large inner diameter can be introduced into the casing part, so that the two disk contours are aligned with one another in the axial direction, for example, and leave a small (radial) gap between them. Between the two disk contours then remains a brake gap section which is, in particular, essentially radial in design.

In particularly preferred configurations, the disk contour has at least one disk pack. The pack of disks is formed, in particular, by a plurality of sheet metal disks that preferably lie directly against one another. Such a configuration enables, for example, the production of disk plates as a stamped part. Punched parts can be produced particularly easily and inexpensively in large numbers. If they are stacked on top of one another and, for example, pressed together, a disk package or a disk body with a significantly greater thickness can be provided easily and inexpensively. As a result, disk sheets (also called disks) and also disk packages can be produced very cost-effectively. Individual disks can also have different properties (e.g., due to different materials). Individual disks can also be made of (sintered) magnetic material (e.g., neodymium).

It is preferred that at least some sheet metal disks or almost all sheet metal disks or all sheet metal disks are each round and have the same diameter or at least similar diameters. However, it is also possible to use a few or individual non-round disk plates on which, for example, a non-round outer contour or a toothed structure or star contour is formed radially on the outside. If circular and non-circular disk sheets are stacked to form a disk pack, a complex outer contour can be created, which can locally lead to a greater magnetic field concentration. It is also possible for a disk pack to include a plurality of round (or non-round) disk sheets with different outside diameters. In this way, round sheet metal plates with a smaller and a larger diameter can be provided alternately.

In particularly preferred configurations, the disk contour has a cylindrical outer contour overall.

It is possible and preferred for the disk contour to have an (axially) outwardly protruding outer contour on at least one axial side. The disk contour can be conical, bulbous, rounded or stepped overall. In particular, the disk contour is rotationally symmetrical formed area of the outer contour. The outwardly projecting outer contour can, for example, be supported on a cover or the like or be guided there. The outwardly protruding outer contour thereby makes it possible to provide a reservoir of magnetorheological particles.

In all configurations using rolling elements, it is preferred that a radial free space for a rolling body between the casing part and the core in the second brake gap section is greater than a gap height in the first brake gap section (in the area of the disk contour). A radial free space results from the difference in the gap height in the second brake gap section minus the diameter of the rolling element. The radial free space is typically divided approximately equally radially outside of the rolling body and radially inside of the rolling body. In simple cases, the rolling element is arranged radially centrally and the radial distance between the outer surface of the rolling element and the inner surface of the shell part and the radial distance from the outer peripheral surface of the core to the radially inner outer surface of the rolling element are approximately the same.

The radial free space (total) for a rolling body in the second brake gap section is preferably more than twice and in particular at least three times as large as the gap height in the first brake gap section. This means that in the normal case, the rolling element has more play radially outwards and radially inwards than the gap height on the disk body in the first braking gap section. It is also possible and preferred that the radial free space for a rolling body in the second brake gap section is four times or even greater than the gap height in the first brake gap section. A gap height at the braking gap section on the disk contour is preferably less than 0.15 mm and preferably less than 0.1 mm.

Preferably, the radial clearance in the second brake gap section and the gap height in the first brake gap section at the disk contour and the gap height in the third brake gap section are (considerably) smaller than a radial distance in other areas of the gap. The radial distance from the outer diameters of the electrical coils or from the outer diameter of a coating over the electrical coils or an extrusion coating of the electrical coils to the radial inner wall of the casing part is (axially) outside of the two brake gap sections preferably (considerably) larger than in the two brake gap sections. The difference in size can reach and far exceed a factor of 2 or 3.

In specific configurations, the radial clearance for a rolling element in the second brake gap section is approximately 0.2 mm, while the gap height in the first brake gap section is approximately 0.05 mm. Deviations of +/−50% are possible in each case. Overall, the radial play on a haptic control button in the area of the rolling bodies is twice the radial free space, since rolling bodies are arranged on opposite sides of the core, a total of 0.4 mm in this example. In the area of the first brake gap section with a gap height of 0.05 mm, there is a total radial play of 2*0.05 mm, ie 0.1 mm.

Because of this very small amount of play, in many cases a separate bearing can be dispensed with, at least at the end of the haptic operating device with the disk contour. The disk contour then, together with the shell part, takes over the guidance or bearing of the shell part relative to the core. This enables an even simpler and more cost-effective construction.

In all configurations, the inner contour or preferably the casing part can be non-round (e.g., elliptical . . . ). The core can also be mounted eccentrically to the casing part. This results in a changing relative gap (section) during rotation.

In particularly preferred configurations, the electrical coils are arranged axially between the first and the second brake gap section. Particularly preferably, at least one braking gap section is axially directly or indirectly adjacent to one of the electrical coils.

In all configurations, it is particularly preferred that the magnetic field of the magnetic circuits passes at least partly axially through the core and the casing part and to a considerable extent radially and particularly preferably essentially radially through the third brake gap section. Furthermore, a significant part of the magnetic field of the first electrical coil passes radially and particularly preferably essentially radially through the first brake gap section and that of the second electrical coil through the second brake gap section. In simple configurations, the electrical coils are each wound around the core and generate a magnetic field in the axial direction of the axis of rotation within the core, which magnetic field is radially outward at the respective ends of the electrical coils and vice versa. Such a configuration allows a particularly simple, inexpensive and yet effective construction.

Preferably, the rolling bodies consist at least partially and in particular almost completely or completely of a magnetically conductive material.

Magnetic non-conductive bodies or rolling elements can also be present. Non-conductive bodies can serve as placeholders or guide elements and can have any shape. Thus, magnetically non-conductive bodies can be arranged between the (magnetically conductive) rolling bodies. Several non-conductive bodies (e.g., guide elements) can be connected to one another, e.g., in the form of a cage. This makes assembly easier.

The disk contour particularly preferably guides the casing part in a rotatable manner and serves as a bearing point.

A closed chamber is preferably formed between the brake components. In particular, the closed chamber is at least to a significant extent and in particular essentially filled with a magnetorheological medium such as a magnetorheological fluid and/or e.g., (dry or powdered) carbonyl iron powder filled. In particular, the second brake component is rotatably received on the first brake component.

The first braking component preferably includes an axle formed at least in part from a non-magnetically conductive material. The core made of a magnetically conductive material is attached to the axle or an inner part.

Preferably, the second braking component is axially displaceable taken on the first brake component. This can (also) serve, for example, to enable volume equalization in the event of temperature changes and/or in the event of a leak. It is preferred that a radial and/or axial position of the two brake components relative to one another is detected by sensors.

In all of the configurations, it is preferred that a click element is arranged at one and in particular at the distal end of the chamber. Such a click element allows in particular two states, after pressing the click element e.g., switches over a metal sheet in an audible and/or tactile manner and thereby performs a (small) axial displacement. Such e.g., designed as snap parts or snap disks click elements are known for example from keyboards or other devices and allow an inexpensive and effective tactile feedback when pressing a button or the like.

The click element is preferably arranged at one end of the chamber. An elastic membrane particularly preferably separates the chamber from the click element. The click element can be designed as a snap part or snap disk. This can provide volume compensation to the chamber as the axle continues to enter or exit the chamber.

In particularly preferred developments, the snap-action disk is designed such that a change in the clamped volume of the snap-action disk between the two states of the snap-action disk is adapted to a cross-sectional area of the axis multiplied by an axial offset of the snap-action disk when actuated. In particular, the two volumes differ by less than 50% or 25% and preferably by less than 10% or less than 5%. Such a configuration, in which the snap-action disk is adapted to the axis, ensures that only a small volume or possibly no volume at all has to be provided for volume compensation when the snap-action disk is actuated.

The use of a click element or snap part at the distal end of the chamber in connection with the formation of the first braking gap section with the disk contour also close to the distal end of the chamber enables a particularly simple and effective guidance and mounting of the casing part, since only a small there is radial play and the disk contour can therefore (in many cases) assume sufficient guidance in the radial direction of the casing part.

In preferred developments, a sensor device or at least one sensor device for detecting a relative angle of rotation s between the core and the casing part is included.

A sensor device or at least one sensor device for detecting a relative axial position of the casing part in relation to the core is preferably included. Particularly preferably, the sensor device or at least one sensor device comprises at least one magnetic field sensor, which is designed to detect an angle of rotation s and an axial position. In particularly advantageous configurations, the sensor device comprises at least one Hall sensor.

In simple preferred configurations, the magnetic field sensor is accommodated on the stationary brake component and is exposed to a magnetic field acting in the radial direction. A rotation angle can also be determined via the orientation of the magnetic field sensor relative to the magnetic field. An axial displacement of the sensor device relative to the casing part can be derived from an intensity of the magnetic field strength.

A torque sensor can measure the torque.

The data recorded by the sensor device can be further processed by the electronics and also passed on to external devices. For example, a haptic operating device installed in a vehicle as a rotary knob/rotary pushbutton (in the steering wheel, in the center console, on the on-board computer, etc.), for controlling the radio and/or the navigation system, changing the chassis settings, etc., data about the change in angle in a vehicle can be transferred to the on-board computer/vehicle electronics/external electronics. Information about the condition of the roadway can be determined from this and/or the user behavior of the user can be recorded, evaluated and optimized. Artificial intelligence can then derive the user's wish from this and optimize/facilitate the control of devices.

At least one shielding device for at least partially shielding the sensor device from a magnetic field of the electrical coil is particularly preferred. The shielding device preferably comprises at least one shielding body. The shielding body is designed in particular to shield a magnetic ring unit for applying a defined (e.g., radial) magnetic field to the magnetic field sensor from interfering magnetic influences of the electric coil. For this purpose, the shielding body is preferably at least in sections of the magnetic ring unit. Preferably, the shielding device surrounds the magnetic ring unit on three sides, namely on both axial sides and radially outwards. The shielding device preferably comprises at least one separating unit arranged between the shielding body and the magnetic ring unit. This decouples the magnetic field of the magnetic ring unit from the shielding body. Furthermore, at least one magnetic decoupling device arranged between the shielding body and the casing part is preferably included. The separating unit and/or the decoupling device preferably have a magnetic conductivity that is many times lower than that of the shielding body. The shielding device and the magnetic ring unit are preferably arranged at a distance from one another.

A shielding device enables a significant improvement in the measurement quality. In particular, fine angular resolutions and small axial distances can be detected as a result. In all configurations, it is preferred that a rotary knob or a rotary wheel is formed on the casing part. The knob can be formed by a kind of coating.

At least one light source is preferably included for illuminating an at least partially transparent rotary knob.

A magnetic field strength of greater than 300 kA/m can preferably be achieved between the individual magnetically polarizable particles. In any case, if the electrical coil generates a maximum magnetic field or a magnetic field in the intended nominal range. The magnetic field strength (which can be generated) in the braking gap is preferably greater than 500 kA/m.

The haptic operating device or a haptic operating or actuating device can also be designed as a joystick device or joystick. A joystick device or other haptic operating device can also be attached via a gear, a belt (toothed belt/flat belt), a linkage or otherwise over or under, so that the operating angle and the angle of rotation of the braking device connected thereto are different.

In all configurations it is preferred that at least one drive device is included for the active rotation of one of the brake components. As a result, not only can a braking torque be generated, but an active rotation can also be achieved, which means that extended haptic feedback can be given. At least one drive device for actively rotating one of the brake components can be included in all developments and configurations of the haptic operating device or an operating or actuating device or a device equipped therewith. The control button, the control roller or the rotary unit can preferably be actively rotated. This allows more haptic information to be returned to the user.

A device according to the invention comprises a haptic operating device, as described above and can in particular be designed as a device component or control button or at least include such a device component or such a control button.

It is also possible that two or more haptic operating devices are included. Such a device or device component can include a user interface, a control panel, a display, a touch-sensitive display with or without haptic feedback and/or at least one sensor or other input and output options.

In particular, the user interface can (also) be loaded by inductive coupling. Since the outer brake component, to which the rotary knob and thus also the user interface are attached in particular, can be rotated, cables for the electrical connection to the outer distal end cannot easily be routed up. Contacting via winding springs or sliding contacts is possible, but increases the basic torque and is therefore not particularly preferred.

In the area of the LEDs or light sources, an electrical coil can be attached for an inductive coupling, which can be used both for energy transmission and for data transmission. In this way, the required electrical energy and the data for the display can be transmitted inductively to the user interface. Data coupling is also possible using other wireless methods.

The magnetic coil is preferably controlled mostly or predominantly during the operating time with a voltage of in particular 12V. In terms of haptics, it is (often) of considerable advantage if the braking torque of the magnetorheological braking device reaches the maximum or set value as quickly as possible. This is sometimes only possible with a greater voltage. A maximum braking torque is generally achieved by a maximum magnetic field in the braking gap. Since the magnetic field is generated by the current in the electrical coil (magnetic coil), the current must also be set to its maximum value as quickly as possible. In principle, you can always set the voltage to a high value, in this specific case instead of e.g., 12V to e.g., 24V. For this, however, all components (electrical coil or magnetic coil, the coil wire, etc.) would have to be designed differently (and e.g., a wire with a larger diameter would have to be used).

In preferred refinements and developments, a higher voltage (than would be necessary in continuous operation) is preferably set only at the beginning of a haptic feedback. In particular at the beginning or almost immediately after haptic feedback, a higher voltage is set (e.g., by a factor of 1.1 or 1.2 or 1.5 or 2 or 3 higher than would be necessary in continuous operation). The higher voltage is maintained until the current (or magnetic field) reaches the desired following value or maximum value (near, e.g., 90% or 95%) and/or the period is reached or exceeded, which the higher voltage can act. Thereafter, the voltage to the lower voltage of e.g., regulated back to 12 V. The system reacts more quickly and the desired braking torque is set more quickly.

This achieves a closer approximation to a rectangle. An (approximately) stepped progression can be set.

In modern electric cars in particular, there are several voltages in the vehicle and high currents are possible, so that they do not have to be generated or transformed separately. Much higher voltages are also available in these electric vehicles (e.g. up to 800 volts) and such current strengths are possible that the properties described above can be used to advantage.

A method according to the invention is used to control or haptic control of a device with a magnetorheological braking device with two braking components, the two braking components being continuously rotatable relative to one another about an axis of rotation, a first braking component extending along the axis of rotation and comprising a core made of a magnetically conductive material and the second Brake component comprises a hollow casing part extending around the first brake component, with at least three axially spaced, circumferential brake gap sections being formed between the first and second brake components and at least partially filled with a magnetorheological medium. A first electrical coil generates a (first) controlled magnetic field in a first braking gap section. Irrespective of this, a second electrical coil generates a (second) controlled magnetic field in a second brake gap section in order to generate braking effects of different strengths, in particular depending on the speed. In this way, the magnetic fields of the first and second electrical coils are in particular both closed via the third braking gap.

A further method according to the invention is used for haptic control of a device with at least one magnetorheological braking device. The magnetorheological braking device includes two (or more) braking components. The two brake components can be moved relative to one another. A first braking component includes a core made of a magnetically conductive material. At least one braking gap at least partially filled with a magnetorheological medium is formed between the first and the second braking component. At least one electrical coil applies a controlled magnetic field to the braking gap. In order to achieve a more rapid and in particular gradual change in the braking intensity, at least one performance parameter of at least one electrical coil is changed more strongly in a first period at the beginning of the change than would be permanently necessary to achieve the desired braking intensity.

This further method according to the invention is also very advantageous. It allows better control of the braking effect. In particular, an improved step response can be achieved. (More gradual) stepped progressions of the braking effect are possible. As a result, the braking intensity can be more "rectangular" than with conventional control. Preferably, at least one performance parameter of the electrical coil is changed in the first period at least 10% or 20% or 30% or 50% or 100% more than the previous time than in the second period.

In particular, the second period is more than three or five times as long as the first period. The first time period preferably has a length of between 3 ms and 30 ms and in particular between 5 ms and 20 ms. In a specific embodiment, the first time period can be approximately 10 ms +/−5 ms.

In preferred developments, the current and/or the voltage of the electric coil are changed in order to change the braking intensity. The voltage is particularly preferably changed as a performance parameter.

Preferably, the power (the power parameter) of at least two electric coils is changed.

The braking gap can comprise at least two or three braking gap sections. More than two braking gaps can also be provided. In particular, at least two braking gap sections can be subjected to magnetic fields from different electrical coils.

It is possible and preferred that, in order to form a haptic stop or a tactile grid, performance parameters (at least one performance parameter, in particular the voltage) of at least one electric coil when there is an increase (compared to a previous point in time) is set higher for the first time period than for the second time period, which is contiguous to the first period and which is longer than the first period.

In preferred developments, the method with a carried out according to the application device, as disclosed in the context of this application. Therefore such a device can have the features described in all the claims in whole or in part. The method can be carried out with the features disclosed in the context of this application. A corresponding use is also possible.

A use according to the invention claims the use of a haptic operating device with a braking device in order to generate a targeted and preferably high braking torque over a larger speed range. The braking device comprises a first braking component and a second braking component. The two brake components are continuously rotatable relative to one another about an axis of rotation. A first braking component extends along the axis of rotation and includes a core of magnetically conductive material. The second brake component includes a hollow shell portion extending around the first brake component. Between the first and second brake components are axially spaced and circumferential brake gap sections that are at least partially filled with a magnetorheological medium, with a third brake gap section being arranged (at least) axially between a first brake gap section and a second brake gap section. A first electrical coil is assigned to the first brake gap section and a separately controllable second electrical coil is assigned to the second brake gap section in order to generate different braking torques in a targeted manner.

At a first braking gap portion e.g., formed a disk contour between the shell part and the core to generate a high braking torque at higher speeds. In a second braking gap section e.g., arranged a plurality of rolling elements on the circumference of the core to generate a high braking torque at lower speeds. A first electric coil is assigned to the first brake gap section and a second electric coil is assigned to the second brake gap section in order to set a braking torque in the respective brake gap sections separately and (largely) independently of one another. Both magnetic fields are closed in particular via the third brake gap section.

In particular, an embodiment or development of a haptic operating device or a device component is used for use, as described above or disclosed in the context of the following exemplary embodiments.

In all of the configurations, the operating or actuating device can also be attached via a gear, belt (toothed belt/flat belt), linkage or otherwise superimposed or reduced, so that the actuation angle and the angle of rotation of the braking device connected thereto are different.

The haptic operating device or a haptic operating or actuating device can also be designed as a joystick device or joystick. A joystick device can also be attached via a gear, a belt (toothed belt/flat belt), a linkage or otherwise geared up or down, so that the actuation angle and the angle of rotation of the associated braking device are different. At least one drive device for actively rotating one of the brake components can be included in all developments and configurations of the haptic operating device or an operating or actuating device or a device equipped therewith.

The control button, the control roller or the rotary unit can preferably be actively rotated. This allows more haptic information to be returned to the user.

Further advantages and features of the present invention result from the exemplary embodiments, which are explained below with reference to the accompanying figures.

BRIEF DESCRIPTION OF THE FIGURES

FIGS. 1a-1b show a schematic three-dimensional views of haptic operating devices with a magneto-rheological braking device's;

FIG. 2 shows a side view of a haptic operating device with a magnetorheological braking device;

DETAILED DESCRIPTION OF THE INVENTION

Figure 3A:
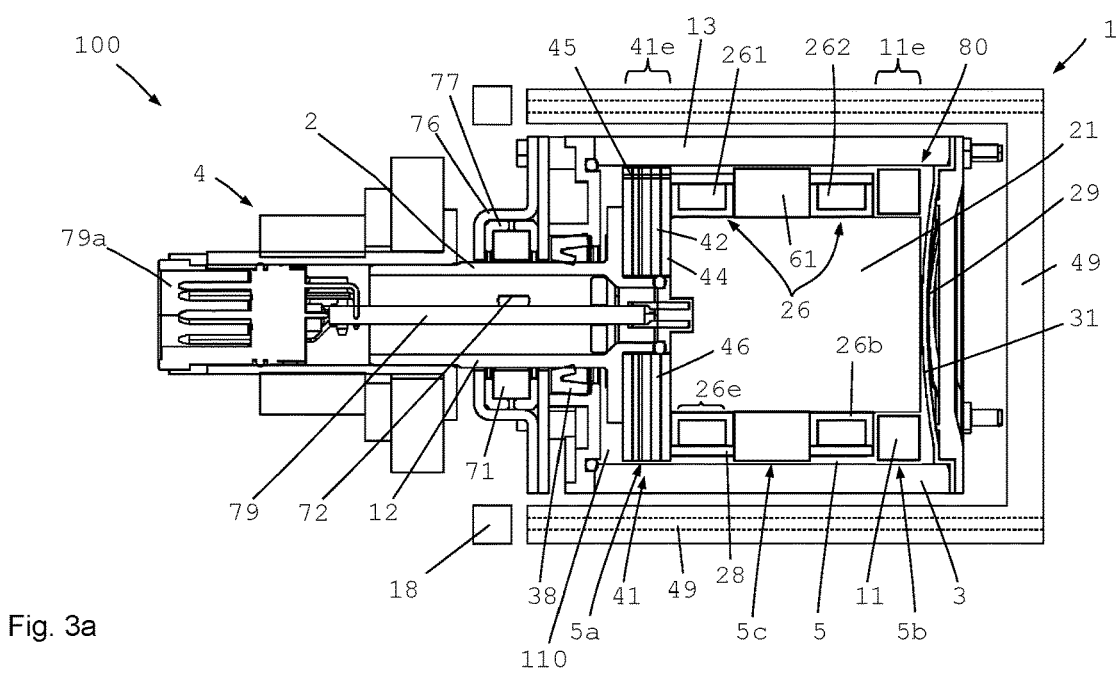
FIGS. 3a-3c show different sections of haptic operating devices.

FIGS. 1a and 1b show two different haptic operating devices 100 according to the invention, each of which includes a magnetorheological braking device 1 and which can be used on different device components 200.

FIG. 1a shows a haptic control knob 101 as a haptic control device 100. The operating knob 101 is attached via the console 50 designed as a holder 4 and can be attached, for example, in a motor vehicle. The operating button 101 is operated via the casing part 13 or a rotary part fitted thereon. A user interface 43 can also be used to transmit information.

In 1b, the device component 200 is shown as a thumb roller 102 with a haptic operating device 100. The thumb roller 102 can preferably be used, for example, in steering wheels of motor vehicles or the like. However, the thumb roller is not limited to this use case. Depending on the installation situation, the thumb roller 102 can generally also be used with any other finger or with several fingers at the same time.

A haptic operating device 100 can be used, for example, to operate machines, medical devices, computer games, music terminals, input devices or for use in and for a motor vehicle. In a motor vehicle, the haptic operating device 100 can be used, for example, to operate air conditioning systems, radios, entertainment, navigation, the distance control, the driving assistant, the recuperation setting, to adjust the seats and to operate the infotainment. It can also be used on other devices or devices.

FIG. 2 shows a side view of a haptic operating device 100, which can be used as an operating button 101. The haptic operating device 100 includes a holder 4, which can be fastened to a console 50, for example, via a nut 51. The haptic operating device 100 includes a magnetorheological braking device 1 with two braking components 2, 3, of which the inner braking component 2 is not visible in FIG. 2. The inner brake component 2 is connected to the holder 4. The holder 4 and the inner brake component 2 are designed to be stationary here. The other brake component 3 includes the casing part 13 and is rotatably accommodated on the first brake component 2.

The haptic operating device 100 has a compact design and inside the shielding device 75, which has a two-part shielding body 76 as a shielding housing, has a sensor device 70 (not visible here) for detecting the rotational position and the axial position of the casing part 13. The casing part is via pins 16 13 with a left cover 14 and a right lid 15 to seal an inner closed chamber 110.

Figure 3B:
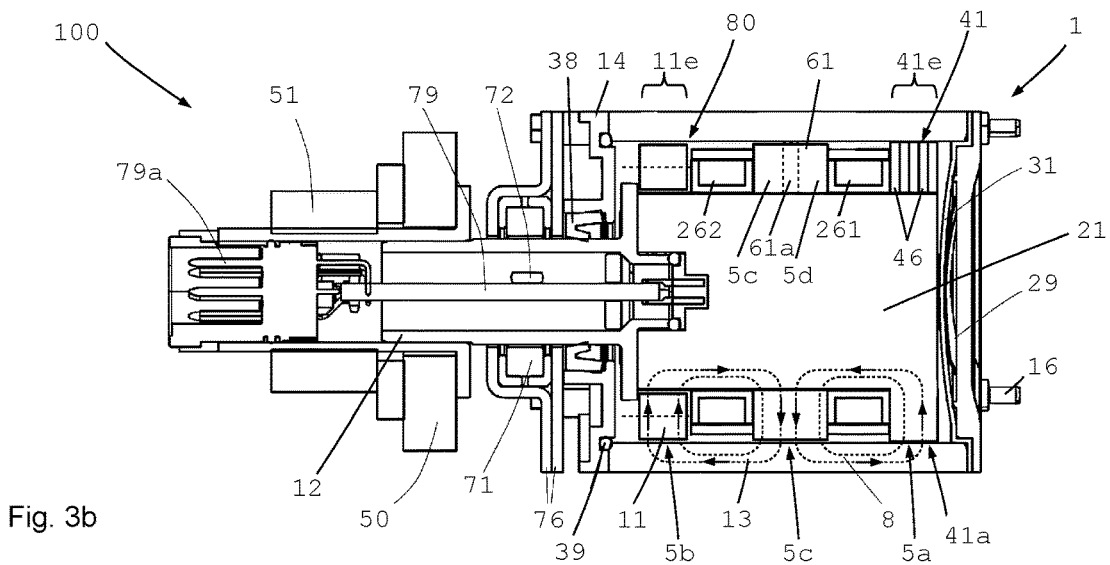
Figure 3C:
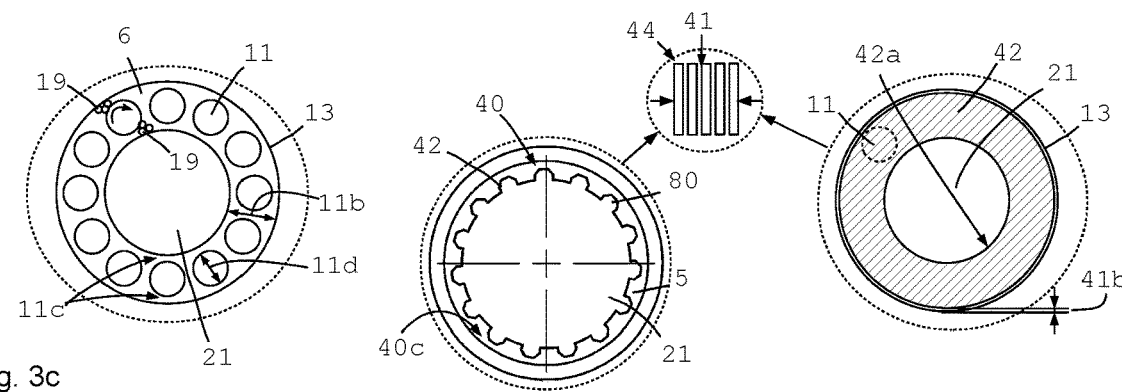

Possible cross sections of a haptic operating device 100 according to the invention are shown in FIGS. 3a to 3c, e.g., shown in FIG. 2. The haptic operating device 100 has a magnetorheological braking device 1. The braking component 2 is accommodated on the holder 4, which extends in the axial direction and to which the core 21 is fastened. The core 21 is surrounded radially by the (magnetically conductive) casing part 13 as the outer or second brake component 3.

The magnetically conductive core 21 is made up of two electric coils 26, which is wound around the core 21. The first electrical coil 261 extends over an axial width 26e. At the end of the core 21 facing the holder 4, a disk contour 41 is formed, which is applied here to the core and, e.g., is pressed. For this purpose, the disk contour 41 has a disk body 42 designed as a hollow cylinder. The receptacle on the core can also be non-round.

In particular, the core 21 can be made of sintered material (metal). The core can thus be manufactured more easily in the desired shape.

The disk body 42 consists here of a disk pack 44 which is formed by a plurality of thin disk plates 46. Here, the sheet metal disks 46 are each formed as a stamped part and can be stamped out, for example, from a magnetically conductive sheet metal with a thickness of 1 mm or 2 mm or even 3 mm. In this way, the required number of sheet metal panes can be punched out easily and inexpensively in order to produce the desired thickness of the pane body 42.

The individual disk plates 46 are pressed together and applied to the core 21 and thus, for example, screwed or pressed. A braking gap section 5a remains in the area of the disk body 42 with a small gap height 41 b between the outer diameter of the disk contour 41 and the inner circumference of the casing part 13. The axial width 41e of the disk contour 41 or its braking gap section 5a is determined here by the number of disk laminations 46 and can be larger or smaller than shown.

Here, the disk contour 41 is axially directly adjacent to the first electrical coil 26, which is accommodated in a coil holder 26b and is completely sealed radially on the outside by a casting compound 28.

The disk body 42 is connected to the core 21 and the fixed brake component 2 and does not rotate during operation. This enables a hole or recess to be formed for the cable 45 to be fed through for the electrical connection of the first and second electrical coils 261, 262. The electrical coils 261, 262 can thereby be connected simply, inexpensively and quickly.

The disk contour 41 is formed here at the proximal end, that is to say at the end of the core 21 which faces the holder 4. At the distal end, that is, at the other end of the core 21, a braking gap portion 5b is formed. The second braking gap section 5b extends over an axial width 11e. There, the rolling elements 11 are distributed on the circumference of the core 21. The rolling elements 11 reinforce the magnetic field locally. The rolling bodies 11 can form a kind of magnetic field concentrators 80 for local amplification of the magnetic field when passing through the second brake gap section 5b.

The second braking gap section 5b allows a very high braking torque to be achieved with the second electrical coil 262, in particular at low speeds of rotation of the casing part 13. Through the first brake gap section 5a in the area of the disk contour 41, a still strong magnetic field can be transmitted from the core 21 to the casing part 13 with the first electrical coil 261 at high speeds, since the gap height 41b is considerably smaller than the radial free space 11c in the area whose brake gap section is 5b. As a result, a high torque can be generated, which is also made possible, in particular, at higher speeds. As a result, a high and finely adjustable torque can be made available over the entire speed range by targeted and separate activation of the two electric coils 261, 262.

The axial width 11e of the second brake gap section 5b and the width 41e of the first brake gap section 5a are approximately the same here (+/−25%) and each shorter than an axial width of the third brake gap section 5c. Overall, a very compact structure is achieved.

The jacket part 13 is surrounded by a cover 49 as a rotary knob 23 shown in FIG. 3a. The knob 23 is at least partially transparent so that it can be illuminated by the lighting means 18 in the form of LEDs, for example. The lighting can be controlled depending on the situation or independently of the situation.

At the front end, the closed chamber 110 inside the casing part 13 is closed off by a front cover 14 through which the brake component 2 is passed. A seal 38 is used for sealing. At the rear or distal end, the chamber 110 is initially delimited by an elastic membrane 31, which is adjoined on the outside by a click element 29 designed here as a snap-action disk.

By axial actuation of the knob 23, the snap disk or the click element is actuated and the jacket part 13 is moved slightly to the left overall. This axial movement can be controlled by the sensor device 70 with the magnetic field sensor 72 inside the holder or of the first brake component 2, which is surrounded radially by a magnetic ring unit 71. The magnetic field sensor 72 is designed in particular as a Hall sensor 72 and detects the alignment of the radial magnetic field relative to the magnetic field sensor 72. In this way, an angular position of the jacket part 13 relative to the core 21 can be detected. An axial adjustment of the casing part 13 by actuating the click element 29 leads to a relative axial offset between the magnetic ring unit 71 and the magnetic field sensor 72, which causes a change in intensity of the detected signal s. In this way, an actuation of the click element can be detected.

FIG. 3b shows a slightly different representation of a haptic operating device 100 with a magnetorheological braking device, in which case, in contrast to FIG. the rotary knob 23 has been omitted.

A major difference between FIGS. 3a and 3b is that in FIG. 3b, the first brake gap portion 5a is provided with the disk contour 41 at the distal end of the casing part 13, while the second brake gap portion 5*b* with the rotating bodies 11 is provided at the proximal end of the casing part 13.

In this configuration, for example, outside of chamber 110 between seal 38 and sensor device 70 there can also be a bearing for mounting jacket part 13 with respect to brake component 2. However, it is also possible here for the bearing to take place at one end only via the seal 38 and at the other distal end only via the disk contour 41.

The disk contour 41 can be formed (circumferentially) in one piece with the core, as is shown schematically in the lower part of FIG. 3*b*. Or the disk contour 41 comprises a (circular) disk pack with a plurality of disk plates 46, as is shown by way of example in the upper part of FIG. 3*b*. The disk contour can also be placed on the core as a solid separate part, that is to say it can practically consist of a single disk sheet of correspondingly greater thickness.

Some magnetic field lines 8 of the first electric coil 261 and the second electric coil 262 are drawn in by way of example in FIG. 3*b*. Furthermore, it can also be seen that in each case an (approximately) radial passage of the magnetic field lines 8 takes place in the braking gap sections 5*a* and 5*b*. A higher torque is generated in the brake gap section 5*a* at higher speeds, while a higher torque is generated in the brake gap section 5*b* at lower speeds. The respective magnetic field is closed in each case in the central area by the (roughly) radial transition to the third brake gap section 5*c*. At the braking gap portion 5*c*, there is practically a thin gap similar to the first Brake gap section when a cylindrical disk contour 41 is used there.

The magnetic field sensor 72 is mounted on a sensor circuit board 79 and can be contacted via the contact pins 79*a*. The electrical coil 26 is also supplied with current via this.

At least in the area of sensor device 70 and magnetic field sensor 72, inner braking component 2 is preferably made of a material that is not magnetically conductive or has little or no magnetic conductivity, in order to enable detection of the orientation and the intensity of the magnetic field of magnetic ring unit 71 in the interior of axle 12 or the to ensure first brake component 2. The sensor device 70 is accommodated there in a particularly protected manner (protection from water and dust).

In FIG. 3*b*, an O-ring can be seen, which seals the cover 14 against the casing part 13.

The third braking gap section 5*c* is formed on the ring contour 61. The ring contour 61 can be slid onto or attached to the core 21 as a separate ring, or the ring contour 61 is formed in one piece with the core 21. In any case, the ring contour 61 is coupled to the core 21 in a magnetically conductive manner.

In a purely schematic manner, the top half of FIG. 3*b* shows an alternative embodiment in which a fourth braking gap section 5*d* is integrated. The fourth brake gap section 5*d* can, for. B. arise from the fact that the annular contour 61 provides two separate braking gap sections 5*c* and 5*d*. For example, two magnetically conductive ring parts can be included, which are separated from one another by a magnetically less conductive intermediate part or ring part 61*a*. Then two axially separated brake gap sections 5*c* and 5*d* are formed. In other configurations, the electrical coils 261, 262 and the brake gap sections 5*c*, 5*d* can also be arranged further apart from one another, so that two magnetic circuits which are further separated from one another are produced.

A structure with three braking gap sections, with the central braking gap section 5*c* being provided for both electrical coils 261, 262, enables a particularly compact structure.

A structure as shown in FIG. 3*a* or 3*b* provides an advantageous embodiment. The second electrical coil 262 enables a particularly strong braking torque in the second brake gap section 5*b* via the rolling elements 11, in particular at low speeds or at a standstill. At higher speeds, the first electrical coil 261 enables a high braking torque via the very small gap height in the first braking gap section 5*a*.

If a rotational movement is to be braked and a stop is to be made available, the first electric coil 261 on the first brake gap section 5*a* enables greater braking at higher speeds than the second electric coil 262 on the second brake gap section 5*b*. At a relatively low transition speed, the braking torque that can be generated with the second electric coil 262 in the second brake gap section 5*b* becomes greater than the braking torque that can be generated in the first brake gap section 5*a* at this speed. This is due to the fact that the braking torque that can be generated via the rolling bodies 11 is more dependent on the rotational speed and drops at higher rotational speeds. A combination of different brake gap sections 5*a*, 5*b* can thus be used to set optimal conditions for different speeds.

FIG. 3*c* shows basic schematic cross sections of braking gap sections 5*a* and 5*b* and 5*c*. In this case, on the left is the second braking gap section 5*b*, wherein the core 21 can be seen inside, on which the rolling elements 11 are arranged schematically all around. The rolling bodies are in turn surrounded by the casing part 13. The rolling elements each have a diameter 11*d*. A radial gap height 11*b* is slightly larger than the diameter 11*d*. A radial free space 11*c* results as the difference between the gap height 11*b* and the diameter 11*d*. The radial free space 11C is generally divided relatively evenly radially on the inside and radially on the outside.

A magnetorheological medium which comprises magnetorheological particles 19 is accommodated in the chamber 110. A gap 5 is provided in the chamber 110 between the brake components 2 and 3. At the gap 5, the three braking gap sections 5*a*, 5*b* and 5*c* are formed. The chamber 110 is at least partially filled with a magnetorheological medium 6 here. The medium here is preferably a magnetorheological fluid which, for example, comprises an oil as the carrier liquid, in which ferromagnetic particles 19 are present. Glycol, grease, water and viscous materials can also be used as a carrier medium, but are not limited to them. The carrier medium can also be gaseous or the carrier medium can be dispensed with (vacuum). In this case, only particles 19 that can be influenced by the magnetic field are filled into the chamber 110.

The ferromagnetic particles 19 are preferably carbonyl iron powder, with the size distribution of the particles depending on the specific application. A particle size distribution of between one and ten micrometers is specifically preferred, although larger particles of twenty, thirty, forty and fifty micrometers are also possible. Depending on the application, the particle size can also become significantly larger and even reach the millimeter range (particle balls). The particles can also have a special coating/shell (titanium coating, ceramic, carbon shell, etc.) so that they can better withstand the high pressure loads that occur depending on the application. The magnetorheological particles can account for this Application not only from carbonyl iron powder (pure iron), but e.g., can also be made of special iron (harder steel).

It is possible that only particles that can be influenced by the magnetic field are filled into the gap 5 or the chamber 110, with air or an inert gas being added if necessary. If, for example, only air or another gas is used, different solids can be mixed to improve certain properties. For example, graphite powder can be mixed in order to reduce the friction between the carbonyl iron particles since graphite exhibits a lubricating effect. In particular, the particles can be coated with PTFE. In particular, a coating with PTFE or a comparable coating prevents the particles from clumping together and forming larger heaps. Such larger heaps do not disintegrate easily or may not disintegrate at all. Alternatively, the disk bodies or roller bodies can be coated with PTFE to reduce friction. When using MRF without oil or other liquid as a carrier medium, it must be ensured that no water condenses in the brake chamber (MR space or MRF space). For example, silicic acid gel (known as silica gel) or another desiccant that absorbs water and thus removes moisture from its surroundings can be mixed in.

In all configurations, developments, and exemplary embodiments, powder without a carrier liquid can preferably be used. Then the use of up to about 80 percent by volume of carbonyl iron (iron powder) is possible, which greatly increases the braking torque if the remaining design parameters are adjusted accordingly (e.g., the field strength per particle should remain about the same as with a magnetorheological fluid (MRF), i.e., the field strength in the braking gap section or braking gap or active gap should be changed from, for example, LORD MRF 140 (40 percent by volume of carbonyl iron with, for example, oil as carrier liquid) to 80% carbonyl iron powder (without carrier liquid) can be twice as high. We are talking about magnetic field strengths in the gap of more than 200 kA/m up to values of up to 1,000 kA/m (1000000 A/m) or more. Another advantage of powder as a medium in the effective gap is that there is no sedimentation and no accumulation in the sense of "the iron particles in MR liquids are pulled in the direction of the magnetic field gradient (the force on magnetizable particles always acts in the direction of the stronger magnetic field, the carrier medium is displaced)" must occur in order to obtain such high particle concentrations. The maximum particle concentration is already present. This improves the reproducibility of the torques (a similar braking torque always occurs with the same current).

In all configurations, it is particularly preferred that the magnetically polarizable particles (especially when used as "dry" powder) (to a significant extent) include non-round particles (non-spherical particles) in which a ratio of the largest diameter to the largest transverse extension perpendicular thereto is greater than 1.25 or 1.5 It is also possible to form this ratio as a ratio of the greatest longitudinal extent to the greatest transverse extent, with the longitudinal and transverse extents in particular being measured perpendicular to one another.

The use of non-round particles is particularly advantageous since they enable an effective canting structure, since different non-round sections of the particles jam or wedge with one another.

Ratios of the largest diameter to the largest transverse extension perpendicular thereto of 1.75 or 2.0 or more are also possible and preferred.

Preferably, at least some of the magnetically polarizable particles are designed to move under the influence of the Magnetic field to jam or wedge together over a large area. This is possible, for example, with particles that are angular in sections or, for example, are triangular or polygonal overall or the like. Two (or more) correspondingly configured particles then jam together and can cause the particles to clump together very effectively and cause the two brake or clutch components to jam and brake together.

At least some of the magnetically polarizable particles are preferably designed to clamp or wedge together under the influence of the magnetic field at two or more locations spaced apart from one another. Such particles, which are non-circular, allow a very effective increase in the braking force or the braking torque, since, unlike spherical particles, they do not only touch at one point or in a small angular range, but at several points or even over an area.

Preferably, at least some of the magnetically polarizable particles have at least one trough section. Such an inwardly curved trough section allows particularly effective wedging with parts of other particles.

Preferably, at least one surface of at least one clutch or brake component adjoining the brake gap is designed to be non-smooth or (locally) uneven at least in sections. It is also possible that the particles or a significant part of the magnetically polarizable particles have elevations or elevations and/or depressions regularly or irregularly on the outer surface. As a result, canting with the particles can be reinforced. For example, at least one surface can have elevations and/or depressions in the manner of pointed or rounded dimples in golf balls. A surface with a pointed or rounded sawtooth profile is also possible. A relative level (at least some) of the Elevations or depressions is preferably at least 5% or 10% of the minimum diameter of a magnetically polarizable particle.

It has been found that a particularly effective canting and jamming of individual particles can be generated with high magnetic field strengths. For this purpose, a magnetic field strength of greater than 150 kiloamperes/meter (kA/m) or 250 kiloamperes/meter or 500 kA/m or more is preferably generated in the brake gap. In particular, a magnetic field strength greater than 500 kiloamperes/meter (kA/m) or 750 kiloamperes/meter or 1000 kA/m or more can be generated in the brake gap or is generated there.

If only powder is used without a liquid carrier medium, a different type of seal can be selected, thereby reducing the basic friction. The seal does not have to be pressed as hard against the surfaces, since it is not necessary to seal for liquids, only particles. A non-contact shaft seal such as a labyrinth seal can also be used, for example. This type of seal only rests on one of the two mutually rotating parts. In addition, the temperature dependence is reduced or almost eliminated. Liquid carrier media change their viscosity with changing temperatures, while carbonyl iron powder hardly changes its properties in very large temperature ranges (until the Curie temperature is reached). The temperature-related volume change is also negligible for powder, since the particles can redistribute among themselves if the volume of the individual particle changes.

The maximum volume fraction of carbonyl iron particles in powder form (approx. 74%) is also higher than in MRF with e.g., oil as a carrier medium.

The magnetorheological particles 19 chain together when a magnetic field is applied, as shown very schematically on the left in FIG. 3c pictured. This creates a wedge effect, which leads to a significant increase in the braking torque at low and medium speeds.

For a more detailed explanation of this effect, reference is made to FIG. 4 of the applicant's international application WO 2018/215350 A1, which, with regard to the explanation of the effect, is fully included in the scope of disclosure of this application in an adapted manner.

A cross section through the first or also the third brake gap section 5a, 5c in the area of the disk contour 41 is shown on the right in FIG. 3c is. Radially on the outside between the outer contour of the disk contour 41 and the inner circumference of the casing part 13 there is a gap height 41*b* which is considerably smaller and can be selected to be considerably smaller than the radial free space 11*c* in the second brake gap section 5*b*. The disk body 42 can be solid or can be designed as a disk pack 44 and include a plurality of disk plates 46. The first and the third braking gap section 5*a, 5c* can in principle have identical or similar cross sections.

A rolling body 11 is shown in dashed lines in the right-hand part of FIG. 3*c*, just as an example, in order to clarify the differences. It can be clearly seen that the disk body 42 allows a gap height 41*b* with a smaller height. As a result, a strong braking torque and a high magnetic field strength can be achieved and transmitted there. A desired magnetic field strength and braking effect can be set independently via the other electric coil in the second brake gap section 5*b*. Both magnetic fields are closed via the third brake gap section 5*c*.

A cross section of a further embodiment of a brake gap section is shown in the center of FIG. 3*c*. This braking gap section has a disk contour 41 designed as a star contour 40. The star contour 40 has a non-round peripheral surface. This creates a braking gap section with a variable gap height 40*c* over the circumference. This can also create a kind of wedge effect, especially at low speeds a high torque can be set. The elements projecting radially outward (or inward) can be referred to as magnetic field concentrators 80, which locally concentrate the magnetic field. A star contour 40 can also be in the form of a disk assembly 44 and can include a plurality of (e.g., star-shaped) sheet metal disks 46.

A star contour can also be formed in the axial direction. This means that variable gap heights occur in the axial direction. As a result, the magnetic field can be concentrated in the axial direction at locations with smaller gap heights and reduced in the higher gaps. A mixture of "radial" and "axial" and/or oblique star contours is also conceivable.

In particular, this configuration is suitable for the second brake gap section 5*b* as a replacement for a (second) brake gap section (5*b*) with rolling bodies.

Figure 4A:
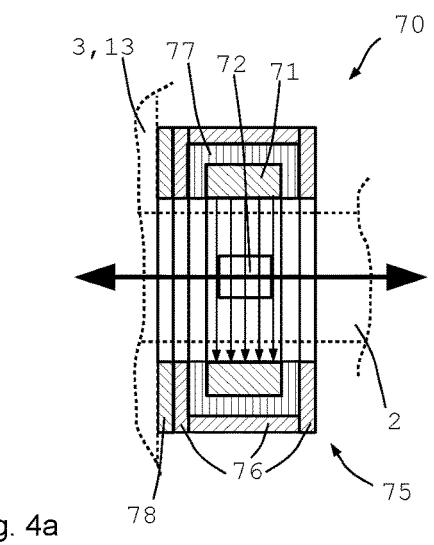
FIGS. 4a-4b show a highly schematic view of a sensor device and measurement results.

The sensor device 70 is shown in detail in FIG. 4*a*. The first brake component 2 and the second brake component 3 embodied here as a casing part 13 are only indicated (dashed lines). The sensor device 70 is supported via the decoupling device 78 on the rotatable second brake component in a magnetically decoupled manner. The shielding device 75 consists here of three shielding bodies 76 from which the scattering of the magnetic field 8 of the electric coil 26 decrease. The shielding device 75 can also consist of only pot-shaped bodies or a pot-shaped body and a disk-shaped body which are connected to one another.

Figure 4B:
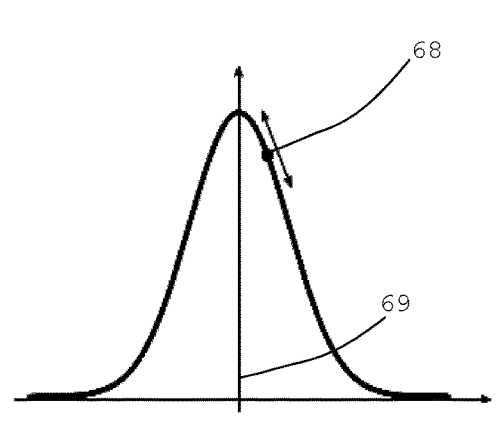

In addition, there is also a separation unit 77 for magnetic separation. The magnetic ring unit 71 is used to measure the orientation or the angle of rotation of the magnetorheological braking device 1. The magnetic field sensor 72 is arranged inside the first brake component 2, which is non-magnetic in this area. Small relative axial displacements, such as those caused by actuating a snap-action disk, can be used to detect the actuation of the control button 101, as shown in FIG. 4*b*. The angle of rotation and the orientation of the magnetic field lines drawn in by arrows can be detected by the magnetic field sensor 72.

Due to an axial displacement, the received signal 68 of the sensor device 70 changes according to the illustration in FIG. 4*b*. FIG. 4*b* shows the course of the amplitude 69 of the signal 68 detected by the magnetic field sensor 72 as a function of the axial displacement of the brake components 2, 3 relative to one another (push). The amplitude 69 of the detected signal 68 changes as a result of an axial displacement of the magnetic field sensor 72 in relation to the magnetic ring unit 71. An axial displacement or pressing down (push) of an operating button 101 can be detected in this way. This preferably confirms a selection or position.

The angle of rotation can also be detected with the same sensor 72, the direction of the magnetic field 8 (arrows shown) being determined to detect the angle of rotation. The intensity determines the axial position. A change in the signal 68 can therefore be used to infer that a button or the snap disk 29 has been actuated. This is advantageous because a single (multidimensional) Hall sensor Determining the angular position and determining an axial position can be used.

Figure 5:
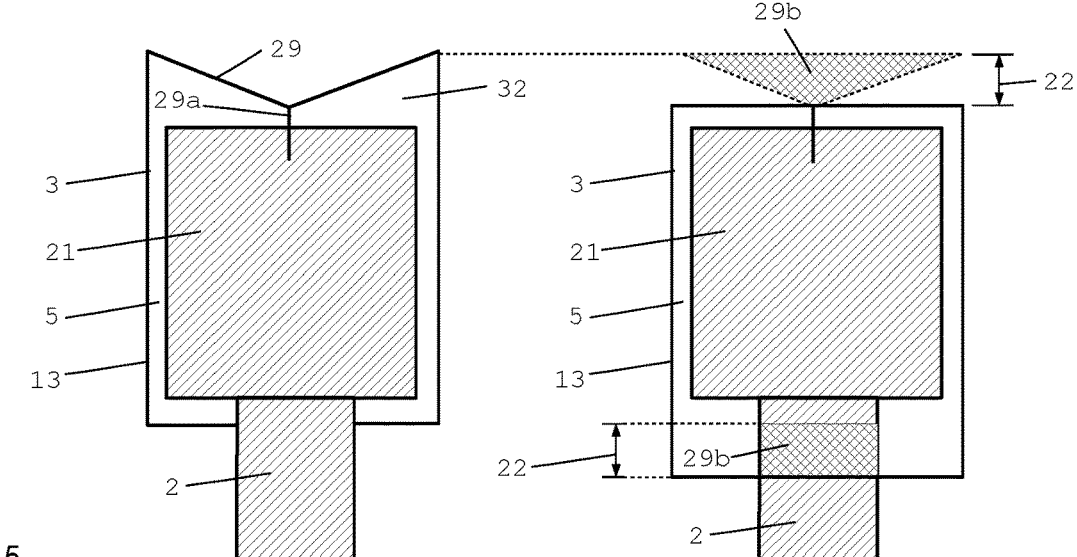
FIG. 5 shows a highly schematic view of a haptic operating device with a snap disk in different positions.

FIG. 5 shows, very schematically, the haptic operating device with a snap-action disk 29 in two different positions, the unactuated position being illustrated on the left and the actuated position on the right. In the illustration on the left, the snap-action disk is curved outwards and downwards here and is guided here by the guide 29*a* in the core (but not supported, so there is almost no friction).

The volume of the stretched triangle 29*b* can be seen in the right half of FIG. 5. The volume 29*b* results approximately from the three-dimensional cone. If the haptic operating button 100 is actuated and the snap disk 29 is moved from the rest position (deflected) to a linear position within one plane, the casing part 13 is displaced axially downwards here in relation to the first brake component 2. As a result, an axial section 22 of the axis or emerges. of the first brake component 2 into the interior within the casing part 13. The change in volume 29*b* of the snap disk 29 is preferably dimensioned in such a way that it essentially corresponds to the immersed volume of the first brake component 2. The immersed volume is calculated from the axial path 22 multiplied by the cross-sectional area of the first brake component 2 on the axle 12. By bringing surface 29*b* as close as possible thereto, pressure buildup within chamber 110 can be minimized or prevented. Volume balancing can also be provided by a membrane 31 as previously discussed.

Figure 6:
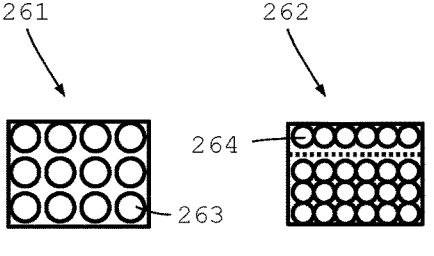
FIG. 6 shows two differently designed electrical coils

FIG. 6 shows, purely schematically, two differently constructed electrical coils 261, 262, in which case the number of windings can differ. The size/type of the diameter and the shape and material of the wires 263, 264 can also be different. The size and external shape of the electrical coils 261, 262 can be the same (shown with a solid line) or can be different, for example, have a smaller cross-section, as indicated by the dashed line. In this way, different properties can be set on the magnetic circuits. One magnetic circuit can be designed for a faster reaction speed and/or a higher braking torque, while the other can be designed to be better in terms of braking properties and/or more energy efficient. A wide variety of property combinations can be achieved. The material at the brake gap sections can be different.

Figure 7:
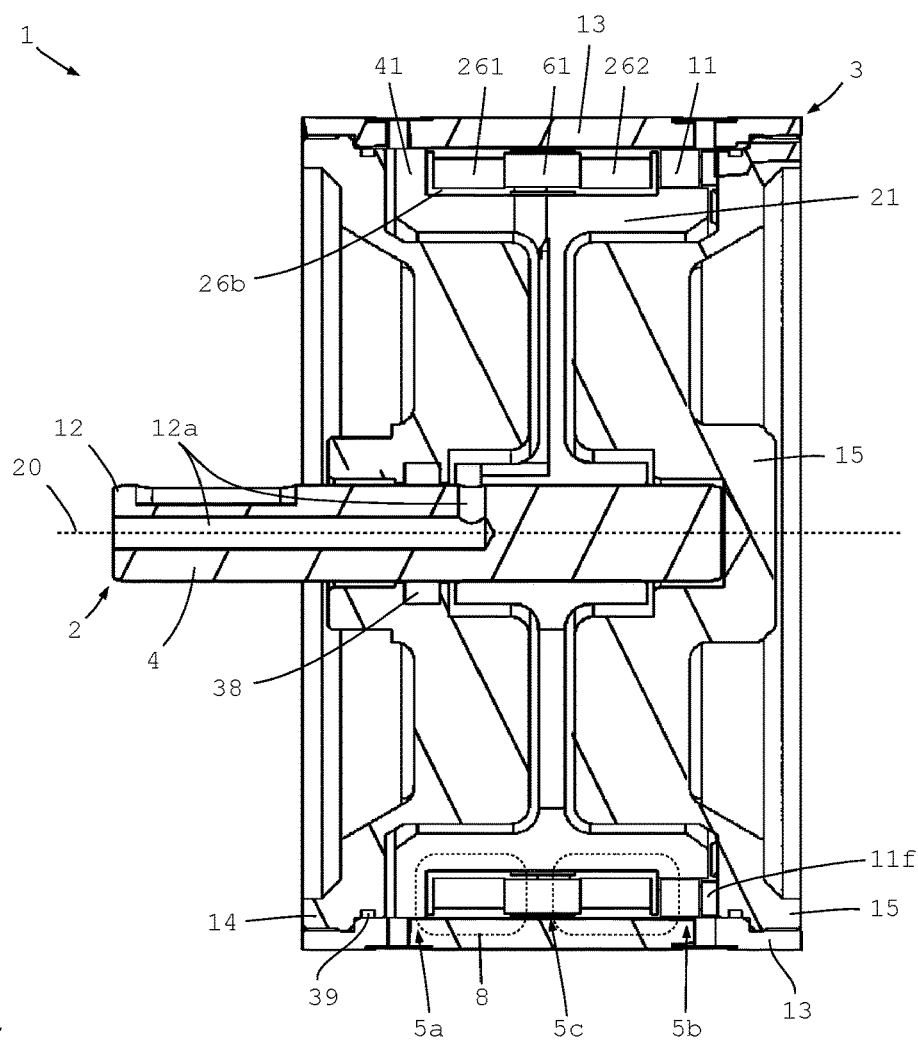
FIGS. 7-8 another haptic operating device in section and in a perspective.
Figure 8:
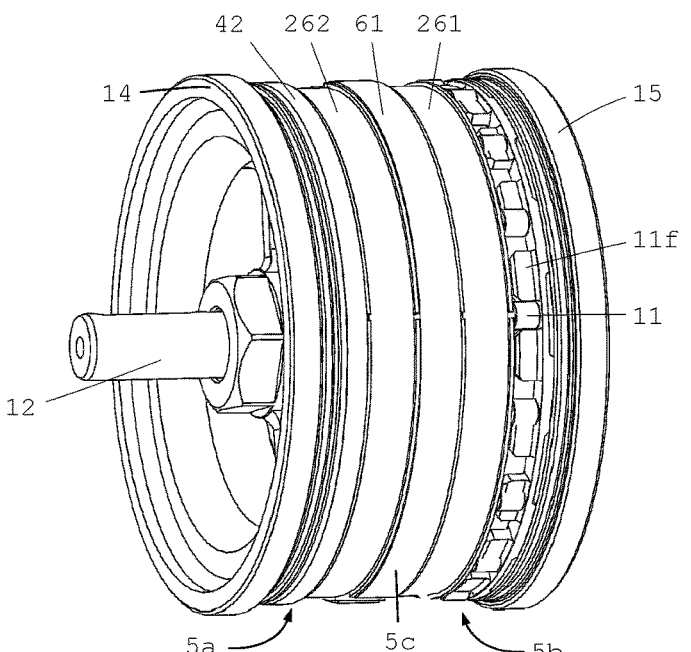

FIG. 7 shows a schematic cross section of a further haptic operating device, with the first brake component 2 being accommodated on a holder 4 designed as an axle 12. In this embodiment, too, three brake gap sections 5*a, 5b, 5c* are provided, with a disk contour 41 being formed on the first brake gap section 5*a* and rolling bodies 11 or rotating bodies on the circumference of the core 21 being accommodated on the second brake gap section 5*b*. The rolling elements 11 are guided over brackets 11*f*.

A reservoir 32 for magnetorheological particles can be present in the interior in order to ensure an adequate supply of the brake gap sections with magnetorheological particles. In particular, carbonyl iron particles are attracted from the environment and concentrated in the magnetic field transition region.

In FIG. 7, a cover 14 is attached to the front (left) end and a cover 15 is attached to the rear end.

The disk body 41 can be formed in one piece with the core 21, but can also be formed as a disk assembly 44 with a plurality of disk plates 46.

A cable bushing 12a is formed on the hollow axle 12, through which the cables for supplying the two electric coils 261 and 261 are passed. The (separate) core 21 is accommodated on the inner part. On the core 21, the two electric coils 261 and 262 are wound on coil holders 26b. Between the two electrical coils 261 and 262, the ring contour 61 for the third brake gap section 5c is taken or formed. In simple configurations, the ring contour 61 is applied to the core 21 as a separate part and provides a thin gap between the outside of the ring contour 61 and the inner circumference of the casing part 13. The third brake gap section 5c is used to close the two Magnetic fields of the two electric coils 261 and 262.

The magnetic field of the first electrical coil 261 runs essentially radially through the first brake gap section 5a and the third brake gap section 5c and axially through the core 21 and the casing part 13. The magnetic field of the second electrical coil 262 runs essentially radially through the second brake gap section 5b and the third brake gap section 5c and axially through the core 21 and the casing part 13. The two electrical coils 261, 262 are wound and energized in such a way that the magnetic fields of the two electrical coils 261, 262 in the region of the third brake gap section 5c run in the same direction, as also shown schematically in FIG. 3b.

Overall, a haptic operating device that can be produced very cost-effectively is provided, with at least one bearing being able to be saved if necessary by "bearing" via the disk contour 41, which also reduces the overall height. A very low basic friction is achieved. The fact that fewer parts are used makes production easier and more cost-effective. A smaller number of parts also improves the tolerance requirements, since tolerance chains are avoided. A haptic control knob, for example as a rotary knob or rotary element with a haptic control device, can be used in a wide variety of areas. With the two electric A braking torque can be set separately for coils 261, 262.

If necessary, an actuation can be detected via a snap part or a snap disk or a button or the like. The rotary knob can be illuminated, for example, via LEDs or the like. The body of the rotary knob can then be partially or completely milky in order to achieve a corresponding scattering effect.

FIG. 6 shows schematically a circuit for fast activation of the electric coil 26. The electric coil 26 (magnet coil) is activated here by an H circuit. This is only indicated in FIG. 9 by switches. A voltage source 35a used in normal operation or in continuous operation with a lower voltage of, e.g., 12V provides the voltage for normal operation. For the voltage peaks, a voltage source 35b with a higher voltage of, for example, 18V or 24V is connected via a switch. Then, the lower voltage power source 35a is temporarily disconnected. After the maximum current has been reached, the higher voltage source 35b is again disconnected from the circuit and the electrical coil 26 and the lower voltage source 35a is reconnected. The switches can be any electrical components that are particularly capable of coupling and decoupling in the millisecond range.

As a result, the current in the electrical coil 26 reaches the desired value more quickly. In a specific case, the desired current is reached within 10 ms instead of 40 ms. The change between the voltages can take place via an electrical circuit.

Figure 10:
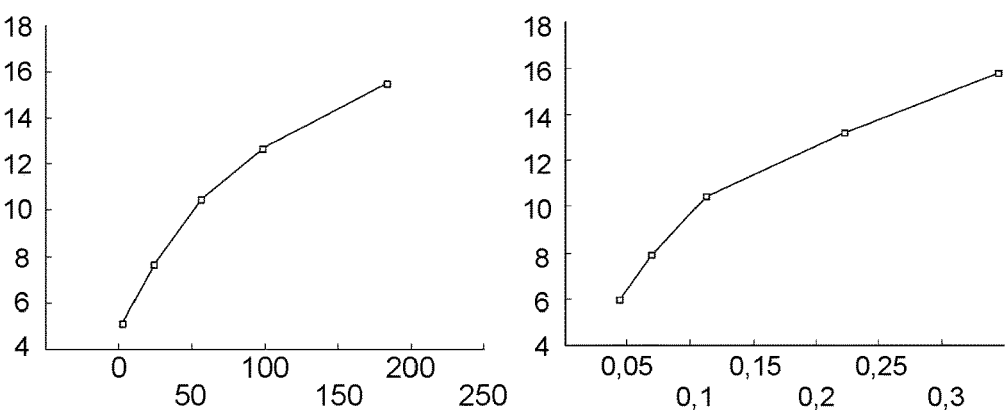
FIG. 10 shows torque curves of an electric motor and a magnetorheological braking device over the electrically introduced power.

FIG. 10 shows a schematic representation of two braking torque curves generated, the braking torque generated (normalized and therefore dimensionless here—Y axis) being plotted against the electrically introduced power (normalized and therefore dimensionless here—X axis). The curve for a BLDC motor ("brushless direct current motor") is shown on the left and the curve for a magnetorheological braking device is shown on the right. It can be seen that the electric motor requires significantly more power than the magnetorheological braking device for the same braking torque a braking torque of "14" requires the electric motor more than "130" normalized power, while the magnetorheological braking device requires a (significantly) lower power of less than "0.3". The power consumption ratio is greater than 100:1 and is around 500:1 here.

Magnetorheological clutch devices and brakes have the advantage, among other things, that they require little power to engage or dampen movements, are quiet, generate little heat and react very quickly (~ms), etc. The low power requirement is particularly advantageous for battery-operated components such as e.g., electric vehicles, in which the power consumption of all components is automatically reflected in the range of the vehicles. However, power consumption is also an issue in vehicles with combustion engines or electrical devices in general.

Figure 11:
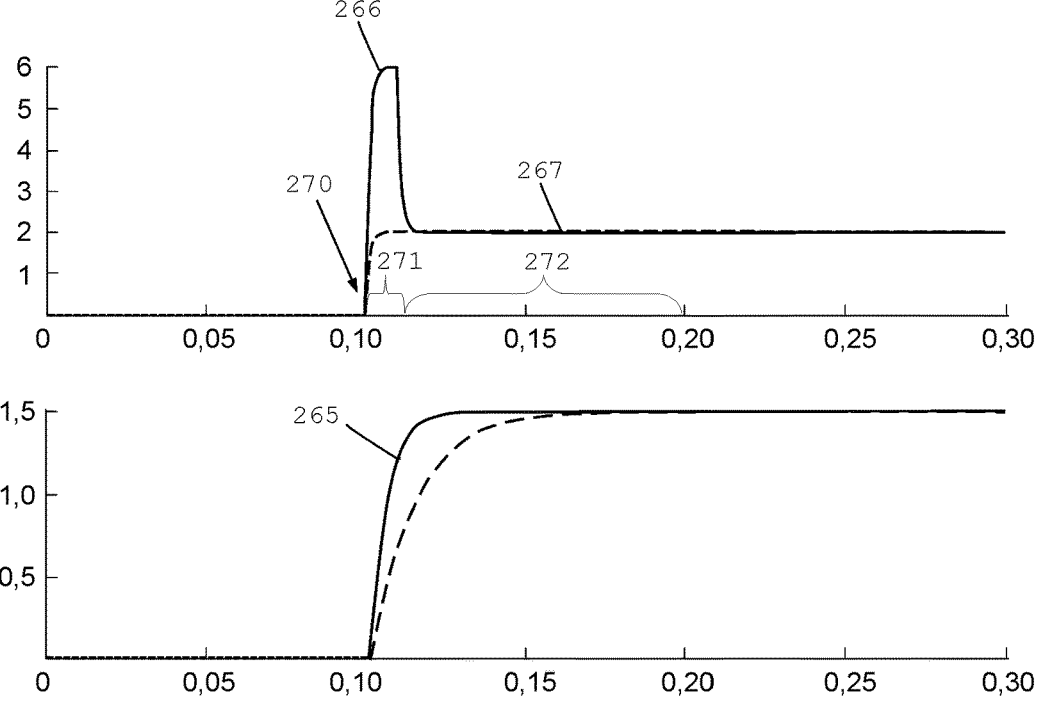
FIG. 11 shows the resulting braking torque curves of a magnetorheological braking device for two different current strength curves over time.

FIG. 11 shows the resulting braking torque curves of a magnetorheological braking device 1 for two different current strength curves (Y axis) over time (X axis). The dashed curve in the upper half of the figure represents the conventional course, in which the current intensity is increased directly to the desired current intensity. The voltage of the electrical coil 261 can also serve as a performance parameter. At the beginning, at the advance point in time 270, the braking torque is to be suddenly increased. For this purpose, the performance parameter 271 is significantly increased at the earlier point in time 270. In fact, it is increased more than is necessary to permanently achieve the braking torque that is then to be set. The performance parameter 271 is at least 10% or 20% higher than the second performance parameter 272. Here even much higher. It is clearly recognizable that the braking torque profile 265 reaches the desired value considerably more quickly due to the excessive increase. As a result, a better approximation of a box-shaped profile can be achieved.

Here, for example, at the point in time 0.1 seconds, the current strength is increased from 0 amperes to 2 amperes. The resulting course of the braking torque or the coupling intensity is shown in broken lines in the lower half of FIG. 11 in the dashed curve. The transmittable braking torque increases from the starting time at 0.1 seconds within about 25 milliseconds (time 0.125 seconds) to a read value of about 1.25 (normalized to e.g., an average value or a standard unit) and reaches after about 75 milliseconds (point in time 0.175 seconds) asymptotically (almost) the set limit value of about 1.5.

If, on the other hand, at the beginning of the clutch or the start of the braking or damping process, the current intensity is increased threefold to, for example, 6 amperes are increased here, as shown by the solid lines, the braking torque increases considerably more and reaches the final value of 1.5 after around 10 milliseconds. The "current boost" with increased current intensity is activated here for only about 10 ms. After that, as shown by the upper solid curve, the current intensity is reduced to 2 amperes. By briefly increasing the current intensity ("current boost"), a significant quicker setting (making available) of the clutch, damping or braking torque. This is very advantageous in several respects, as it allows you to stop quickly and experience a more direct haptic feeling (feedback). In reality, the difference between the two curves is very noticeable.

Figure 9:
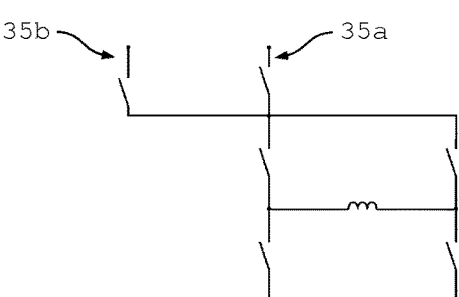
FIG. 9 shows a highly schematic circuit for controlling the electrical coil.

FIG. 9 shows a schematic of a circuit for rapid activation of the electrical coil 26. The electrical coil 26 (magnetic coil) can be used here, for example, be driven by an H circuit. This is only indicated here by switches. A voltage source 35a used in normal operation or in continuous operation with a lower voltage of e.g., 12V (or 3V or 6V; depending on the application, a suitable voltage) provides the voltage for normal operation. For the voltage peaks, a voltage source 35b with a higher voltage of, for example, 18V or 24V (or, for example, 6V or 12V) is connected via a switch.

Then, the lower voltage power source 35a is temporarily disconnected. After reaching the maximum current, the voltage source 35b with higher voltage is again from the circuit and electrical coil 26 are disconnected and low voltage power source 35a is reconnected. The switches can be any electrical components that are particularly capable of coupling and decoupling in the millisecond range.

As a result, the current in the electrical coil 26 reaches the desired value more quickly. In a specific case, the desired current is reached within 10 ms instead of 40 ms. The change between the voltages can take place via an electrical circuit.

A combination of voltage and current is also possible. Voltages of over 24 volts and far above (e.g., >100 volts) are also possible.

Instead of one electrical coil, two or more electrical coils can be used, which are designed differently (wire thickness, number of turns, material . . . ) and are supplied with different currents in order to obtain the boost effect.

Figure 12:
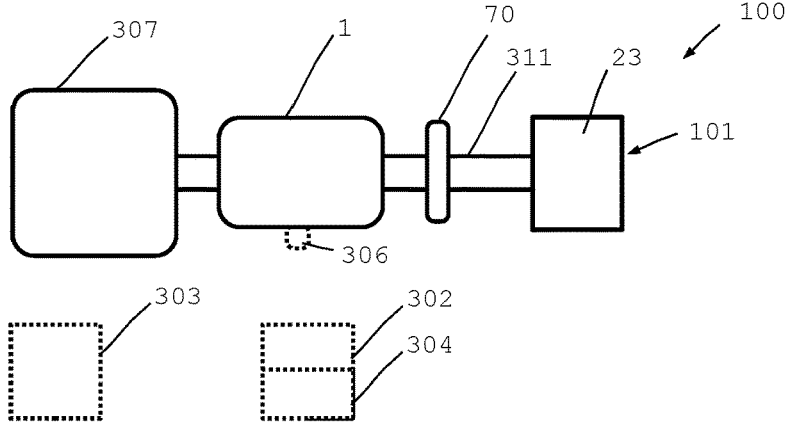
FIG. 12 shows a schematic view of a haptic operating or actuating device according to the invention with a drive device.

FIG. 12 shows a haptic operating device 100 according to the application for operating a wide variety of devices, facilities and devices, as described in this application and description (introduction, general description, description of the exemplary embodiments and claims). For turning, for example, a knob 23 (also in the form of a control roller) is used. The use of a steering unit or a steering wheel is also possible for operation. The rotary knob 23 or the control knob 101 can be connected in particular to the shaft 311 in a rotationally fixed manner.

The haptic operating device 100 can also be designed as a steer-by-wire steering system.

In this exemplary embodiment and in all other exemplary embodiments, refinements and developments, an actuator device 303 can be included in order to convert the rotational movement into another movement. In particular, the actuator device 303 can also only be electrically connected to the control knob 101.

The rotation of the control knob 101 is by means of a sensor device 70 and, for example, a rotation angle sensor detected. Depending on the angle of rotation, the actuator device 303 then controls other components or actuators.

A drive device 307 designed as an electric motor is connected to the shaft 311 here. The control knob 101 can be actively rotated by the drive device 307. As a result, the operating knob 101 is (actively) rotated in certain cases, for example—but not only—in the case of (simulation of) steering, in order to give the operator appropriate haptic feedback.

The movement of the operating button or rotatable operating element 101 can be braked in a targeted and controlled manner by means of a magnetorheological braking device 1. To control the braking device 1 and also the drive device 307 depending on various parameters and, e.g., the angle, a control unit 302 can be provided here. To this end, control unit 302 is operatively connected to sensor device 70.

Control unit 302 also takes data from an assistance system 304 into account, for example. As a result, the movement of rotatable operating element 101 can be influenced in a targeted manner depending on the driving situation. Control unit 102 can also be operatively connected to other sensors, not shown in detail here, in order to be able to specifically influence the behavior as a function of other parameters.

The braking device 1 is equipped here with a safety device 306 which removes a magnetorheological medium 6 (not visible here) from a gap 5 (also not visible here). In the event of a fault, for example, the braking torque can be canceled very quickly and reliably. The gap 5 and the medium 6 can be selected as described within the scope of this application and as shown in the further figures.

The operating or actuating device 100 according to the invention shown in FIG. 12 can be used to rotate an operating or actuating means of an operating or actuating unit that is not shown in detail here. The operating or actuating unit 101 is designed here as a rotatable button which is connected to a shaft 311 in a rotationally fixed manner.

The operating or actuating device 100 can also be embodied here as a steer-by-wire steering of a game (gaming; force feedback steering wheel), without being restricted thereto. An actuator device 303 is used for this purpose to convert the steering movement executed with the operating or actuating unit 101 into a (virtual) vehicle movement in a (racing) game (e.g., Need for Speed; Project Cars; Moto GP; Flight Simulator . . . ). For example, the actuator device 303 steers the (virtual) vehicle wheels or the vehicle wheel in the case of a motorcycle. The actuator device 303 is then only electrically connected to the steering unit 101.

The rotational movement of a steering unit is detected by means of a sensor device 70 and, for example, a rotational angle sensor. Depending on the angle of rotation, the actuator device 303 then steers, e.g., the vehicle wheels in the video game.

A drive device 307 designed as an electric motor is connected to the shaft (or steering shaft) 311 here. The steering unit 301 can be actively rotated by the drive device 307. As a result, the steering unit 301 is actively moved, for example when cornering or backing up, as would also be the case with a conventional mechanical steering system in a real vehicle.

The movement of the operating or actuating unit 101 can be braked in a targeted manner by means of a magnetorheological braking device 1. To control the braking device 1 and also the drive device 307 depending on various parameters and e.g., the steering angle is a (steering) control unit 302 is provided here. For this purpose, the (steering) control unit 302 is operatively connected to the sensor device 70.

The (steering) control unit 302 also takes into account, for example, data from a (driving) assistance system 304 or data from other players or game situations (Sim Racer; racing simulators . . . ). As a result, the movement of the steering unit 301 can be influenced in a targeted manner depending on the driving situation. The (steering) control unit 102 can also be operatively connected to other sensors or information sources of a game, not shown in detail here, in order to be able to specifically influence the steering behavior as a function of other parameters.

The control button can also be used on or in an industrial plant, in computer peripherals, in automobiles, airplanes, etc. and can be supplemented by the active component described above.

The invention provides a haptic operating device that is compact, robust and very inexpensive. The haptic control device is particularly suitable for use in the automotive industry, but can also be used in all kinds of devices and machines.

A major advantage of the construction is that no cables, sensors or electronics are required on the outside. A high IP class is therefore possible in all configurations. In principle, everything is behind a mounting panel.

The electrical coils are preferably completely separated from the space containing the magnetorheological medium, in particular by means of a casting compound.

In preferred configurations, an axial displacement is possible, in which case, in particular, a liquid volume is displaced in the interior. Sufficient space is preferably provided between a cover and a disk contour so that the medium (or liquid) or carbonyl therebetween is not compressed. (Otherwise this could lead to high axial displacement forces.) This provides an additional MRF reservoir from which particles can flow into the area of the disk contour or the rolling elements. Namely, magnetic particles always flow in the direction of the stronger field since magnetic particles are attracted by the magnetic field gradient.

The seal preferably runs on the axle. There is rotary movement (more than 100,000 revolutions are possible) and there can be linear movement for the probe. To ensure that the seal does not run in and form a running groove and that the friction is low, and the leakage (drag oil) does not become too high over the service life, a corresponding material pairing with a hard running surface is preferred.

The first brake gap section 5a is preferably equipped with a disk contour. The second braking gap section 5b is equipped with rolling bodies and, in particular, rollers. Rolling elements and especially rollers with a round inner ring enable a high static moment. A disk contour enables good magnetic field transmission and high torque at high speeds.

The combined solution, also called hybrid solution, combines both advantages. In contrast, an axial transition of the magnetic field in the prior art had a smaller transition area and thus resulted in lower braking torques. In addition, an axial magnetic field transition has a smaller distance (radius) and therefore generates less moment. A brake gap section 5a, which is also radial, with a disk contour has a larger diameter and thus generates a larger moment with the same force. In addition, the area is larger because the larger circumference spans a larger area. If the width of the contour disk is greater than ⅙ of the diameter, the braking torque that can be transmitted at the (circumferential) radial braking gap section is already greater than the maximum braking torque that can be transmitted on the axial surface! Finally, due to the lower gap height at the disk contour, the magnetic losses are smaller. All this also causes a higher braking torque at higher speeds.

Volume compensation for the push function can be provided by a membrane at the end of the jacket part. Behind the membrane is a click element like a snap-action disk ("Snap Dome"). This gives a haptic pressure point. You can also hear the click when the pressure point is reached, and the snap-action disk presses the entire button or the casing part back into the starting position back (similar to a mouse button on a computer mouse).

The membrane then seals off the MRF space. The volume behind the membrane acts as a volume balance when pressed. In the normal position, the snap disk has a bulge. If the button is moved in the axial direction, the stator of the braking device presses against the membrane and the snap-action disk. This will be pressed flat.

The design of the haptic control device can be enhanced by adding various light effects to the cover. A cost-effective variant is the use of a cap/cover with a transparent element, which is illuminated from below with LEDs. This can be done either by attaching a transparent sleeve to the shell part or by incorporating it into the cover, or by doing the entire inside of the cover as such (an inverted pot). For this purpose, the transparent part can be ground at an angle at the edges in order to deflect the light in the desired direction.

Normal glass can be used as the transparent material, or PMMA (acrylic glass). The advantage of PMMA is that you can use milky glass, which breaks the light inside and can thus illuminate the entire surface evenly. One or more LEDs can be used for lighting, also with different colors.

In all configurations, the outer brake component can also be designed to be non-rotatable and the inner brake component the be a rotatable component. In this case, the electric coil must be electrically contacted via lines through the outer braking component or e.g., via sliding contacts.

If a coil spring is used as electrical contact, an absolute sensor is preferred to set the angle of rotation (e.g., absolute rotary encoder) and the control does not allow over-rotation. Blocking at a certain angle or a warning haptic feedback can occur so that the coil spring is not or cannot be torn off.

LIST OF REFERENCES 1 magnetorheological braking device
2, 3 braking component
4 holder
5 braking gap
51 brake gap section for 41
5b braking gap section for 11
5c braking gap section for 61
5d braking gap section
6 magnetorheological medium
8 magnetic field lines
11 rolling body
11b radial gap height of 5b
11c radial free space at 5b
11d diameter of 11
11e axial width of 11
11f brackets
12 axle
12a cable bushing
13 casing part
14 cover
15 cover
16 pin
18 lights
19 ferromagnetic particles
29 axis of rotation, axial direction
21 core
22 axial path, axial section
23 rotary knob
26 coil
26b coil holder
26e axial width
28 casting compound
29 click element, snap disc
29a guide
29b volume
31 membrane
32 reservoir
35a power supply 12V
35b power supply 18V
38 seal 39 O-ring
40 star contour
40c gap height
41 disk contour
41a integral annular flange
41b gap height of 5a
41e axial width of 5a
42 ring body, disk body
42a holder
43 user interface
44 disk pack
45 cables
46 disk plates
47 protruding outer contour
48 screw
49 cover
50 console
51 nut
61 ring contour
68 signal
69 amplitude
70 sensor device
71 magnetic ring unit
72 magnetic field sensor
75 shielding device
76 shielding body
77 separation unit
78 decoupling device
79 sensor circuit board
79a contact pin
80 magnetic field concentrator
100 haptic control device, haptic operating device
101 control button
102 thumb roller
110 closed chamber
200 device component
261 first electric coil
262 second electric coil
263 wires
264 wires
265 braking torque profile
266 first performance parameters
267 second performance parameter
270 time
271 first performance parameters
272 second performance parameter
302 control unit
303 actuator device
304 assistance system
305 remanence device
306 safety device
307 drive device
311 shaft

The invention claimed is:

1. A haptic operating device comprising:
a magnetorheological braking device having a stationary holder and at least two braking components, one of the two braking components being non-rotatably connected to the holder and the two brake components being continuously rotatable relative to one another about an axis of rotation;
a first brake component of the at least two braking components extending along the axis of rotation and having a core made of a magnetically conductive material;

a second brake component of the at least two braking components having a casing part extending around the first brake component;
at least three braking gap sections, being circumferential and at least axially spaced apart, disposed between the first and second brake components, the at least three braking gap sections being at least partially filled with a magnetorheological medium; and
a first braking gap section of said at least three braking gap sections, a second braking gap section of said at least three braking gap sections and a third braking gap section of said at least three braking gap sections being arranged axially between said first braking gap section and said second braking gap section; and
said first braking gap section having a first electrical coil and the second braking gap section is associated with a separately controllable second electrical coil;
at least one star contour being arranged on at least one braking gap section between the casing part and the core, a variable gap height disposed in the area of the star contour over a circumference of the braking gap section, and magnetic field concentrators being arranged on the star contour and said magnetic field concentrators protruding radially into the braking gap section.

2. The haptic operating device according to claim 1, wherein the first braking gap section and the second braking gap section have different configurations.

3. The haptic operating device according to claim 1, wherein the first braking gap section and the second braking gap section are at least partially made of different material.

4. The haptic operating device according to claim 1, further comprising a disk contour being arranged between the casing part and the core on at least one braking gap section.

5. The haptic operating device according to claim 4, wherein the disk contour is a separate disk body or formed in one piece with the core.

6. The haptic operating device according to claim 5, wherein the disk body is applied to the core and has a receptacle adapted to the core, and the disk contour is connected to the core.

7. The haptic operating device according to claim 4, wherein the disk contour guides the casing part in a rotatable manner and serves as a bearing point.

8. The haptic operating device according to claim 1, further comprising a plurality of rolling elements being arranged on a circumference of the core on at least one braking gap section.

9. The haptic control device according to claim 8, wherein the rolling elements are arranged on a rolling body holder.

10. The haptic operating device according to claim 1, wherein the first electrical coil and the second electrical coil are each received between the casing part and the core, and the first electrical coil and the second electrical coil are each wound around the axis of rotation.

11. The haptic operating device according to claim 1, wherein the first electrical coil and the second electrical coil have at least one different physical property.

12. The haptic operating device according to claim 1, wherein the first electrical coil and the second electrical coil differ in at least one parameter, said parameters being selected from the group consisting of wire diameter, wire shape, number of windings, winding window, spool width, spool diameter, and material.

13. The haptic operating device according to claim 1, wherein the third braking gap section is formed by at least one ring contour which is located between the casing part and the core.

14. The haptic operating device according to claim 13, wherein the ring contour is a separate part of the haptic operating device.

15. The haptic operating device according to claim 13, wherein magnetic fields of the first electrical coil and the second electrical coil run through the ring contour.

16. The haptic operating device according to claim 15, wherein the magnetic fields of the first electrical coil and the second electrical coil each extend axially through the core and the casing part, and substantially radially pass through the third braking gap section.

17. The haptic control device according to claim 1, wherein the holder has an axle on which a cable bushing is formed and through which electrical cables are routed via an inner part connected to the axle to the first and the second electrical coil.

18. The haptic operating device according to claim 1, wherein the two electrical coils are accommodated on a coil holder.

19. The haptic operating device according to claim 1, further comprising a first and a second cover being connected to the casing part, and at least one of the first and second cover being sealed relative to the axis.

20. The haptic operating device according to claim 1, further comprising a fourth braking gap section.

21. The haptic operating device according to claim 1, wherein the first braking gap section, second braking gap section, and third braking gap section are formed at a common braking gap.

22. The haptic operating device according to claim 21, wherein a magnetic field strength in the braking gap is greater than 500 kA/m.

23. The haptic operating device according to claim 1, further comprising a closed chamber being formed between the brake components, and wherein the closed chamber contains a magnetorheological medium.

24. The haptic operating device according to claim 1, wherein the second braking component is disposed to be axially displaceable on the first brake component.

25. The haptic operating device according to claim 24, further comprising a click element being arranged at the distal end of the chamber, and wherein an elastic membrane separates the chamber from the click element.

26. The haptic operating device according to claim 25, wherein the click element is a snap disk and a change in the spanned volume of the snap disk is adapted to a cross-sectional area of the axis multiplied by an axial offset of the snap disk upon actuation.

27. The haptic operating device according to claim 1, further comprising a sensor, said sensor being configured for detecting a relative angle of rotation between the core and the casing part, and/or for detecting a relative axial position from the casing part to the brake component.

28. The haptic operating device according to claim 1, wherein the magnetorheological medium has a multiplicity of individual magnetically polarizable particles, and a magnetic field strength between the individual magnetically polarizable particles is greater than 300 kA/m.

29. The haptic operating device according to claim 1, further comprising at least one drive device for active rotation of one of the brake components.

30. An operating button comprising a haptic operating device according to claim 1.

31. The operating button according to claim 30, further comprising:
   at least one user interface;
   a control panel;
   a display;
   a touch-sensitive display with or without haptic feedback; and/or
   at least one sensor.

32. A haptic operating device comprising:
   a magnetorheological braking device having a stationary holder and at least two braking components, one of the two braking components being non-rotatably connected to the holder and the two brake components being continuously rotatable relative to one another about an axis of rotation;
   a first brake component of the at least two braking components extending along the axis of rotation and having a core made of a magnetically conductive material;
   a second brake component of the at least two braking components having a casing part extending around the first brake component;
   at least three braking gap sections, being circumferential and at least axially spaced apart, disposed between the first and second brake components, the at least three braking gap sections being at least partially filled with a magnetorheological medium; and
   a first braking gap section of said at least three braking gap sections, a second braking gap section of said at least three braking gap sections and a third braking gap section of said at least three braking gap sections being arranged axially between said first braking gap section and said second braking gap section; and
   said first braking gap section having a first electrical coil, the second braking gap section is associated with a separately controllable second electrical coil, and said third braking gap section being formed by at least one ring contour which is located between the casing part and the core; and
   the first electrical coil being arranged axially between the first braking gap section and the ring contour, and the second electrical coil being arranged axially between the ring contour and the second braking gap section.

33. A haptic operating device comprising:
   a magnetorheological braking device having a stationary holder and at least two braking components, one of the two braking components being non-rotatably connected to the holder and the two brake components being continuously rotatable relative to one another about an axis of rotation;
   a first brake component of the at least two braking components extending along the axis of rotation and having a core made of a magnetically conductive material;
   a second brake component of the at least two braking components having a casing part extending around the first brake component;
   at least three braking gap section, being circumferential and at least axially spaced apart, disposed between the first and second brake components, the at least three braking gap sections being at least partially filled with a magnetorheological medium; and
   a first braking gap section of said at least three braking gap sections, a second braking gap section of said at least three braking gap sections and a third braking gap section of said at least three braking gap sections being arranged axially between said first braking gap section and said second braking gap section;

said first braking gap section having a first electrical coil and the second braking gap section is associated with a separately controllable second electrical coil; and a disk contour being arranged between the casing part and the core on at least one braking gap section, the disk contour being a separate disk body or formed in one piece with the core, and the disk contour being a disk pack with a plurality of disk plates, and at least one disk plate being a stamped part.

34. A haptic operating device comprising:

a magnetorheological braking device having a stationary holder and at least two braking components, one of the two braking components being non-rotatably connected to the holder and the two brake components being continuously rotatable relative to one another about an axis of rotation;

a first brake component of the at least two braking components extending along the axis of rotation and having a core made of a magnetically conductive material;

a second brake component of the at least two braking components having a casing part extending around the first brake component;

at least three braking gap sections, being circumferential and at least axially spaced apart, disposed between the first and second brake components, the at least three braking gap sections being at least partially filled with a magnetorheological medium; and a first braking gap section of said at least three braking gap sections, a second braking gap section of said at least three braking gap sections and a third braking gap section of said at least three braking gap sections being arranged axially between said first braking gap section and said second braking gap section;

said first braking gap section having a first electrical coil and the second braking gap section is associated with a separately controllable second electrical coil; and a plurality of rolling elements being arranged on a circumference of the core on at least one braking gap section, a radial clearance for said rolling element between the casing part and the core in the second braking gap section being greater than a gap height in the first braking gap section and/or third braking gap section.

35. A haptic operating device comprising:

a magnetorheological braking device having a stationary holder and at least two braking components, one of the two braking components being non-rotatably connected to the holder and the two brake components being continuously rotatable relative to one another about an axis of rotation;

a first brake component of the at least two braking components extending along the axis of rotation and having a core made of a magnetically conductive material;

a second brake component of the at least two braking components having a casing part extending around the first brake component;

at least three braking gap sections, being circumferential and at least axially spaced apart, disposed between the first and second brake components, the at least three braking gap sections being at least partially filled with a magnetorheological medium; and a first braking gap section of said at least three braking gap sections, a second braking gap section of said at least three braking gap sections and a third braking gap section of said at least three braking gap sections being arranged axially between said first braking gap section and said second braking gap section;

said first braking gap section having a first electrical coil and the second braking gap section is associated with a separately controllable second electrical coil; and a plurality of rolling elements being arranged on a circumference of the core on at least one braking gap section, the radial free space for a rolling element in the second braking gap section being more than twice as large as the gap height in the first braking gap section and/or in the third braking gap section.

36. A method for haptic control of a haptic operating device, the method comprising:

providing a haptic operating device having, a magnetorheological braking device having a stationary holder and at least two braking components, one of the two braking components being non-rotatably connected to the holder and the two brake components being continuously rotatable relative to one another about an axis of rotation, a first brake component of the at least two braking components extending along the axis of rotation and having a core made of a magnetically conductive material, a second brake component of the at least two braking components having a casing part extending around the first brake component, at least three braking gap sections, being circumferential and at least axially spaced apart, disposed between the first and second brake components, the at least three braking gap sections being at least partially filled with a magnetorheological medium, a first braking gap section of said at least three braking gap sections, a second braking gap section of said at least three braking gap sections and a third braking gap section of said at least three braking gap sections being arranged axially between said first braking gap section and said second braking gap section, and said first braking gap section having a first electrical coil and the second braking gap section is associated with a separately controllable second electrical coil;

generating, via the first electrical coil, a controlled magnetic field in the first and the third braking gap section; and generating an independently controlled magnetic field, via a second electrical coil, in the second braking gap section and the third braking gap section, wherein the generated braking effects of different strength depending on a speed of rotation of the casing part.

37. The method according to claim 36, wherein with the first electrical coil and the second electrical coil different fast braking effects are generated.

38. The method according to claim 36, wherein braking effects of different energy efficiency are generated with the first electric coil and the second electric coil.

* * * * *